US010026061B2

(12) United States Patent
Cheek et al.

(10) Patent No.: US 10,026,061 B2
(45) Date of Patent: Jul. 17, 2018

(54) INTERACTIVE ORGANIZATION VISUALIZATION TOOLS FOR USE IN ANALYZING MULTIVARIATE HUMAN-RESOURCE DATA OF ORGANIZATIONS

(71) Applicant: Macromicro LLC, Boston, MA (US)

(72) Inventors: Alexander R. W. Cheek, Doha (QA); James B. Peterson, Boston, MA (US)

(73) Assignee: Macromicro LLC, Boston, MA (US)

( * ) Notice: Subject to any disclaimer, the term of this patent is extended or adjusted under 35 U.S.C. 154(b) by 936 days.

(21) Appl. No.: 14/470,288

(22) Filed: Aug. 27, 2014

(65) Prior Publication Data

US 2014/0365389 A1    Dec. 11, 2014

Related U.S. Application Data

(63) Continuation-in-part of application No. PCT/US2013/040841, filed on May 14, 2013.

(60) Provisional application No. 61/870,845, filed on Aug. 28, 2013, provisional application No. 61/646,516, filed on May 14, 2012.

(51) Int. Cl.
*G06F 3/048*  (2013.01)
*G06Q 10/10*  (2012.01)

(52) U.S. Cl.
CPC .................. *G06Q 10/105* (2013.01)

(58) Field of Classification Search
CPC .. H04L 41/22; H04N 1/00429; H04N 1/0042; G06F 3/048
See application file for complete search history.

(56) References Cited

U.S. PATENT DOCUMENTS 6,549,219 B2 *  4/2003  Selker ................. G06F 3/0482
                                                      345/902
7,594,191 B2     9/2009  Leidig et al.
(Continued)

FOREIGN PATENT DOCUMENTS

WO    20000016307 A1    3/2000

OTHER PUBLICATIONS

International Search Report and Written Opinion dated Nov. 14, 2013, issued in connection with related PCT/US13/40841.

*Primary Examiner* — Mahelet Shiberou
(74) *Attorney, Agent, or Firm* — Downs Rachlin Martin PLLC

(57) ABSTRACT

Visualization tools, and systems and software underlying such tools, for allowing user to visualize organizations of people. Members of an organization are represented by unabstracted nodes. In some embodiments, visualization diagrams are efficiently created by abstracting the unabstracted nodes in a manner that reduces the number of nodes needing to be rendered, while retaining the visual character of a similar diagram composed of the original, unabstracted nodes. In these embodiments, regions of abstraction diagrams can be selectively de-abstracted in response to a user's selection within the abstraction diagram. In response to such a selection, in some instances only a particular hierarchical reporting chain within the organization, or a portion thereof, is de-abstracted to allow the user to view unabstracted nodes within that chain. Also disclosed are other visualization tools, such as attribute-overlay tools, time-scrubbing tools, and geographic distribution tools, among others.

34 Claims, 30 Drawing Sheets

(56) References Cited

U.S. PATENT DOCUMENTS

| | | | |
|---|---|---|---|
| 7,643,029 B2* | 1/2010 | Hao | G06T 11/206 345/440 |
| 8,184,016 B2* | 5/2012 | Gray | G01D 4/002 340/870.11 |
| 8,640,055 B1* | 1/2014 | Dunning | G06F 3/0482 715/853 |
| 2006/0229902 A1* | 10/2006 | McGovern | G06Q 10/06 705/321 |
| 2008/0162382 A1 | 7/2008 | Clayton et al. | |
| 2008/0168347 A1 | 7/2008 | Hallyn | |
| 2008/0307369 A1 | 12/2008 | Liu et al. | |
| 2009/0006427 A1 | 1/2009 | Veeraraghaven et al. | |
| 2009/0187864 A1* | 7/2009 | Bedell | G06F 3/04817 715/854 |
| 2010/0070904 A1* | 3/2010 | Zigon | G01N 15/147 715/771 |
| 2010/0287512 A1* | 11/2010 | Gan | G06F 17/30994 715/854 |
| 2011/0007075 A1* | 1/2011 | Lee | G06F 3/0482 345/440 |
| 2011/0055755 A1 | 3/2011 | Chen et al. | |
| 2011/0219324 A1* | 9/2011 | Watanabe | G06F 3/048 715/771 |
| 2012/0166206 A1* | 6/2012 | Feely | G06Q 10/10 705/1.1 |
| 2012/0240064 A1* | 9/2012 | Ramsay | G06T 11/00 715/762 |
| 2013/0032147 A1* | 2/2013 | Robinson | A61M 16/0051 128/204.18 |
| 2013/0044114 A1* | 2/2013 | Burtner | G06T 11/206 345/442 |

* cited by examiner

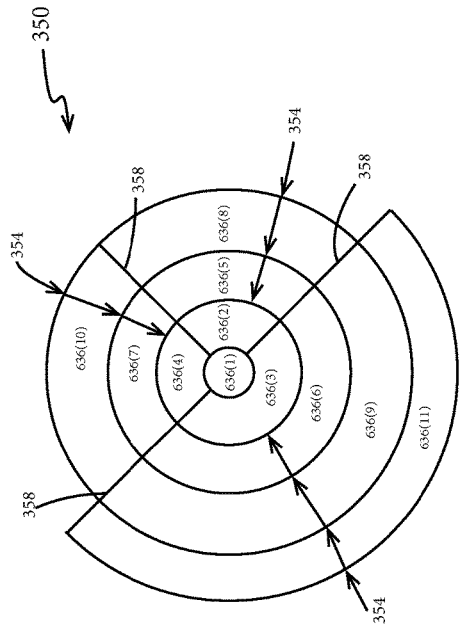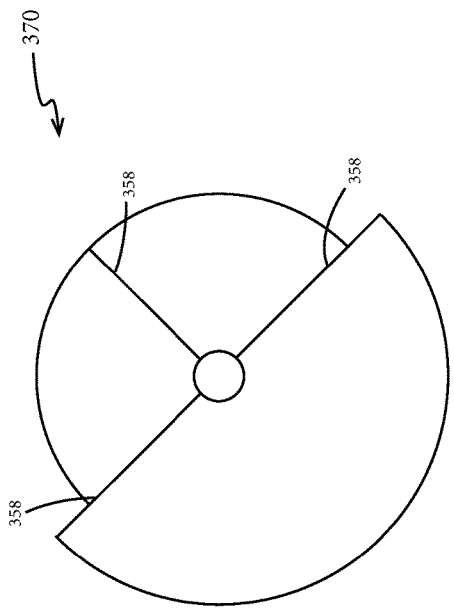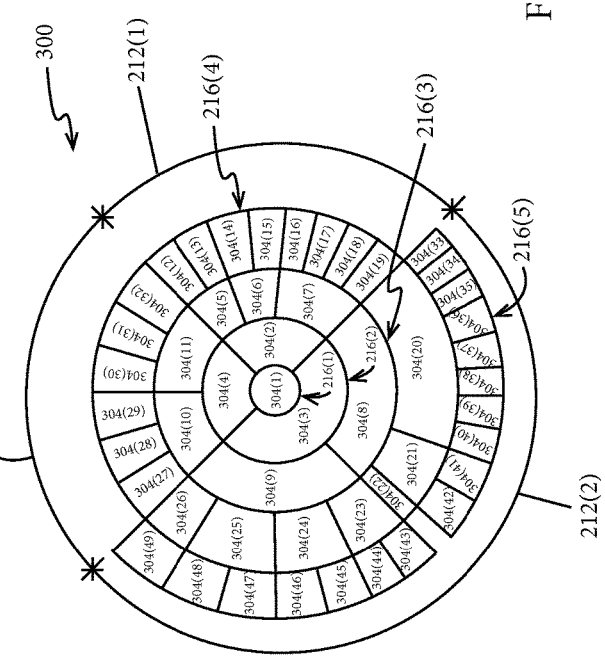

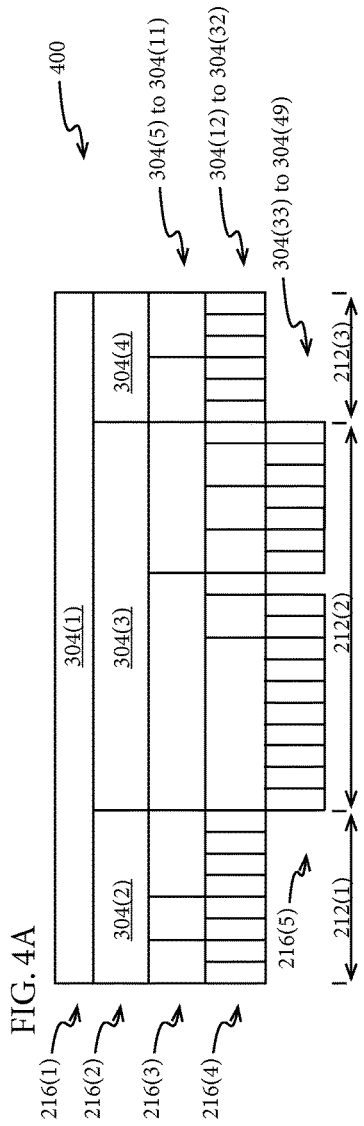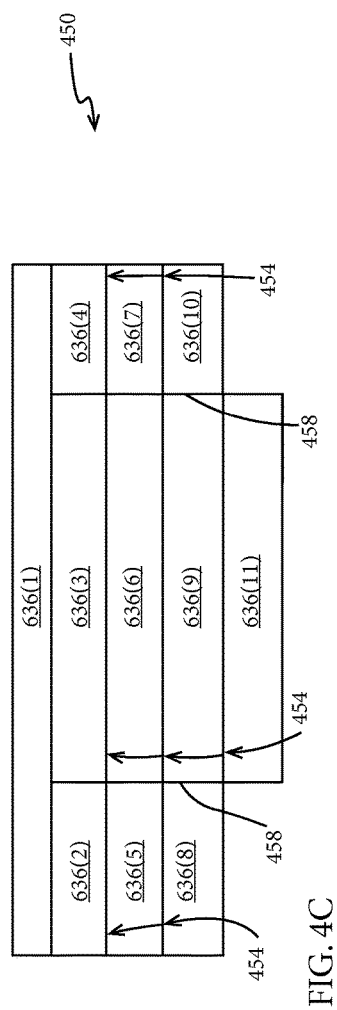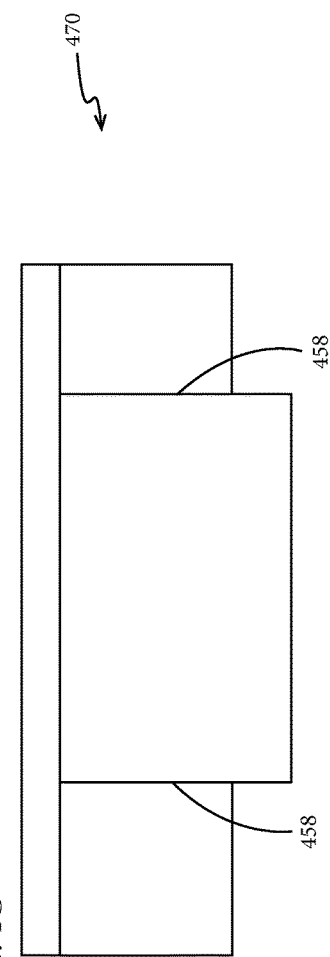

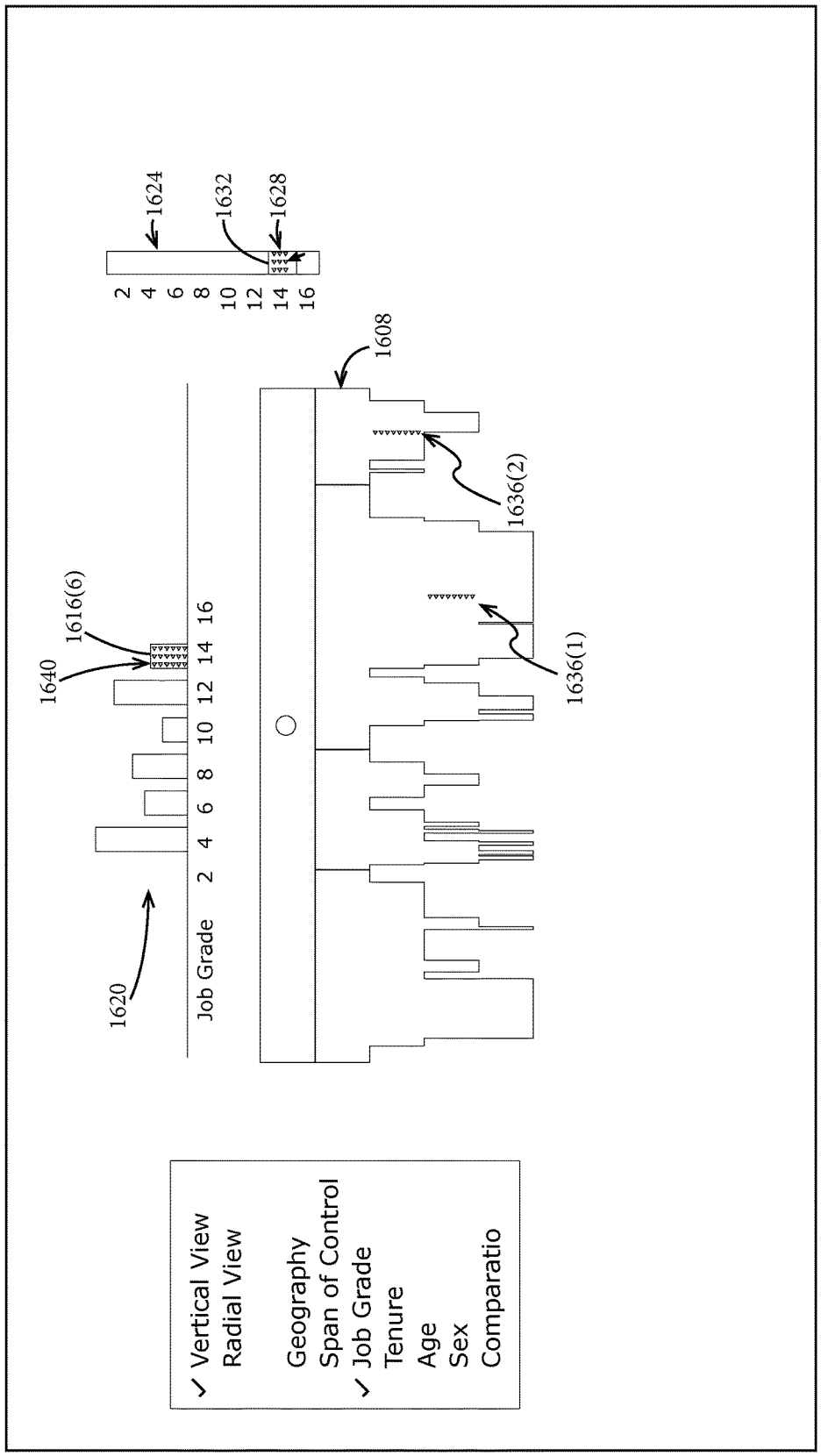

INTERACTIVE ORGANIZATION VISUALIZATION TOOLS FOR USE IN ANALYZING MULTIVARIATE HUMAN-RESOURCE DATA OF ORGANIZATIONS

RELATED APPLICATION DATA

This application is a continuation-in-part of PCT Application PCT/US13/40841, filed on May 14, 2013, and titled "INTERACTIVE ORGANIZATION VISUALIZATION TOOLS FOR USE IN ANALYZING MULTIVARIATE HUMAN-RESOURCE DATA OF ORGANIZATIONS," which claims the benefit of priority of U.S. Provisional Patent Application Ser. No. 61/646,516, filed on May 14, 2012, and titled SYSTEM AND METHODS FOR DISCOVERING RELATIONSHIPS, COMMUNITIES AND KNOWLEDGE ASSETS OF AN ORGANIZATION THROUGH VISUAL AND INTERACTIVE MEDIA," which is incorporated by reference herein in its entirety. This application also claims the benefit of priority of U.S. Provisional Patent Application Ser. No. 61/870,845, filed on Aug. 28, 2013, and titled LAYERED-HISTOGRAM VISUALIZATIONS FOR INTERACTIVE ORGANIZATION VISUALIZATION TOOLS FOR USE IN ANALYZING MULTIVARIATE HUMAN-RESOURCE DATA OF ORGANIZATIONS," which is incorporated by reference herein in its entirety.

FIELD OF THE INVENTION

The present invention generally relates to the field of organizational analysis. In particular, the present invention is directed to interactive organization visualization tools for use in analyzing multivariate human-resource data of organizations.

BACKGROUND

It is often desirable to access, analyze, and mine data regarding the human resources of any of a wide variety of organizations, such as for-profit and not-for-profit companies, governments, government agencies, social organizations, religious organizations, academic institutions, and healthcare institutions, among many others. However, tools for performing these tasks are often either unavailable, unwieldy, or constrained in their functionality. This is especially true relative to organizations having thousands, tens of thousands, or even hundreds of thousands or more members.

SUMMARY OF THE DISCLOSURE

In one implementation, the present disclosure is directed to a method of displaying a visualization diagram of an organization of members on an electronic display. The method includes electronically receiving hierarchical organizational data concerning the members of the organization, wherein the hierarchical organizational data represents a plurality of unabstracted nodes corresponding respectively to the members of the organization; automatedly consolidating at least some of the unabstracted nodes into abstracted nodes; automatedly assigning weights to the abstracted nodes as a function of how many unabstracted nodes are represented by each of the abstracted nodes; and automatedly rendering the abstracted nodes on the electronic display as a part of creating the visualization diagram.

In another implementation, the present disclosure is directed to a machine-readable hardware storage medium containing machine-executable instructions for performing a method of displaying a visualization diagram of an organization of members on an electronic display. The machine-executable instructions include a first set of machine-executable instructions for receiving hierarchical organizational data concerning the members of the organization, wherein the hierarchical organizational data represents a plurality of unabstracted nodes corresponding respectively to the members of the organization; a second set of machine-executable instructions for consolidating at least some of the unabstracted nodes into abstracted nodes; a third set of machine-executable instructions for assigning weights to the abstracted nodes as a function of how many unabstracted nodes are represented by each of the abstracted nodes; and a fourth set of machine-executable instructions for rendering the abstracted nodes on the electronic display as a part of creating the visualization diagram.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A is a sunburst diagram representing the 49-member organization of FIG. 2, showing all 49 nodes that represent the 49 members;

FIG. 3B is an abstraction sunburst diagram representing the 49-member organization of FIG. 2, in which the 49 nodes have been reduced via a node-abstraction algorithm;

FIG. 3C is a visually merged abstraction sunburst diagram formed by visually merging the abstraction nodes of the abstraction sunburst diagram of FIG. 3B;

FIG. 4A is an icicle diagram representing the 49-member organization of FIG. 2, showing all 49 nodes that represent the 49 members;

FIG. 4B is an icicle diagram representing the 49-member organization of FIG. 2, in which the 49 nodes have been reduced;

FIG. 4C is a visually merged abstraction icicle diagram formed by visually merging the abstraction nodes of the abstraction icicle diagram of FIG. 4B;

FIG. 16B is a simulated screenshot of the organizational diagram of FIG. 16A visually cued for a selected job grade using a graduated selector;

DETAILED DESCRIPTION

Figure 1:
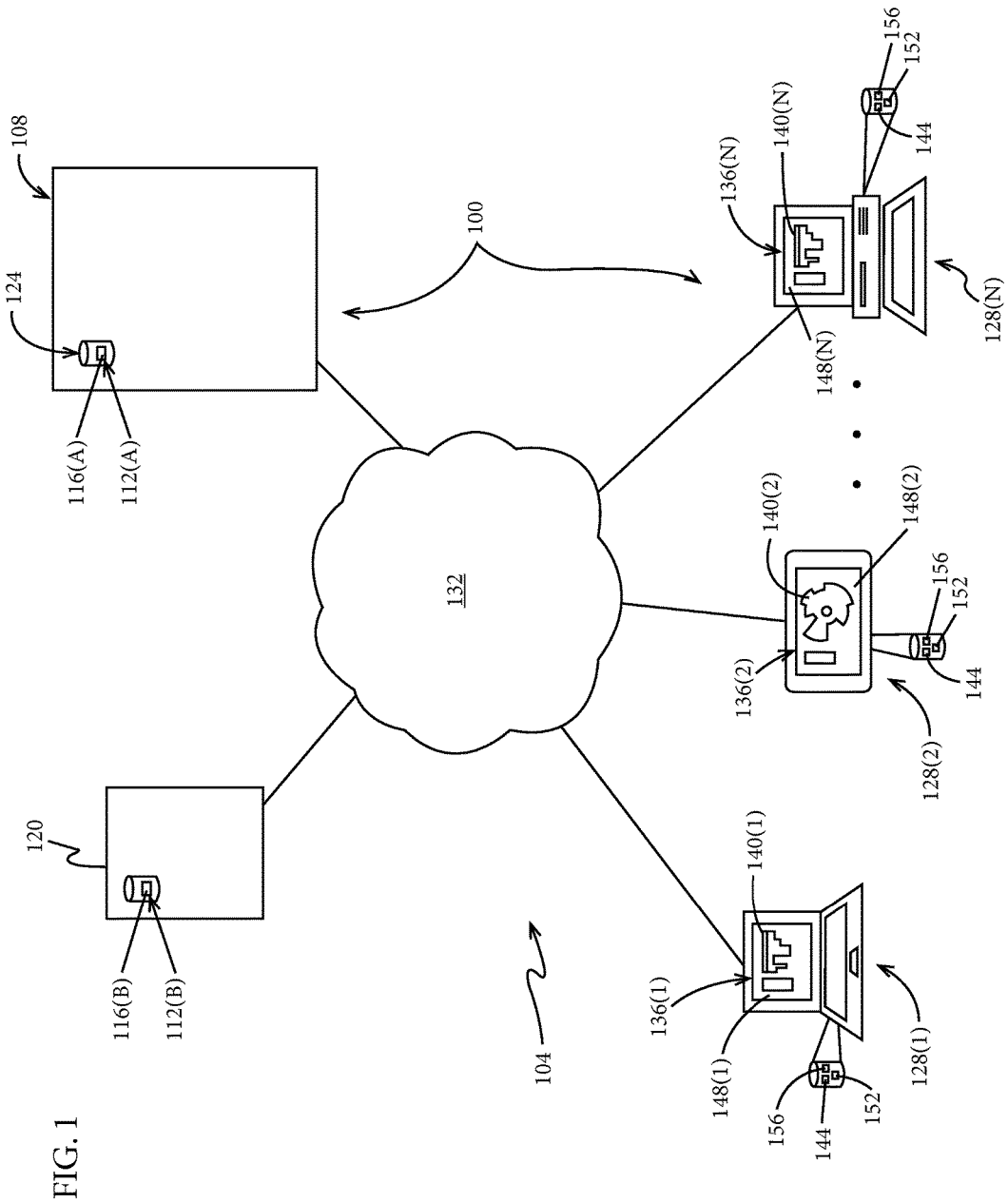
FIG. 1 is a high-level diagram of an interactive organization-visualization tool (IOVT) system in an exemplary operating environment.

Aspects of the present invention include tools and techniques for automatedly and interactively creating desired visualization that allow one or more users to visualize, assess, evaluate, track, etc., human resources of an organization by permitting the user(s) to visualize the organization in terms of the organization's members and/or any one or more of a variety of human-resource attributes of the members. Examples of human-resource attributes of members include, but are not limited to, member name, age, gender, position, hierarchical level, lateral segment, physical location, phone number, email address, member reported to, member(s) reporting to, compensation, tenure, job grade, compa-ratio, etc. Tools of the present invention can enable users within an organization to, among other things, access, interact with, and visualize organizational data, combine datasets, and easily view data over time in clear, compelling, and useful forms. Tools of the present invention can enable a user inside or outside of an organization to study the organization via visualizations that can give the user unique perspectives from which to view the organization. The unique visualizations of given data can allow for new types of comparisons and understandings of organizational structures. Exemplary uses of tools and techniques of the present invention include 1) aiding in understanding of organizational structure, organizational history, and large organizational datasets through visualizations, 2) enabling interactive digital space that reveals new information about an organization and create the possibility for new discoveries about the organization, and 3) permitting differing types of access to organizational datasets depending on a particular user's role within an organization or outside the organization.

Another aspect of the present invention is an interactive organization-visualization tool (IOVT) system that may not only implement the interactive visualization tools and techniques listed above and/or that are similar thereto, but may also provide a full environment for implementing various ones of those tools and techniques. A further aspect of the present invention is IOVT software that implements interactive visualization tools that are the same as or similar to the tools listed above. These and other aspects of the present invention are described below in connection with several embodiments. Those skilled in the art, however, will readily appreciate that the disclosed embodiments are merely exemplary and that many other embodiments can be derived and instantiated using the broad teachings of this disclosure. Before proceeding to describe an exemplary embodiment, several terms used through this disclosure and in the appended claims are first defined immediately below.

A "visualization" is any form of visual output of aggregate data, rendered on an electronic display, made interactive through a mouse and graphical user interface or through any other suitable user input means and user interface, such as a touchscreen and natural user interface.

A "sunburst diagram" is one type of visualization that takes the form of a radial graph and is sometimes called a "rose-petal diagram." A sunburst diagram is an egocentric graph of an organization's hierarchy having its root, or highest position/level within the organization, at the hub of the diagram, with subordinate levels radiating outward from the root in a hierarchical manner.

An "icicle diagram" is another type of visualization, which takes the form of a rectilinear, vertical graph and can be used in lieu of a sunburst diagram. The root, i.e., highest position/level within the organization, is located at the top of the icicle diagram, with subordinate levels depending from the root in a hierarchical manner.

A "pop-out diagram" is a smaller diagram made from a selected node on a subordinate level of a larger organizational diagram. The root node of a pop-out diagram is the selected node, and the subordinate level(s), if any, of the pop-out diagram contain only children nodes of the selected node. Typically, but not necessarily, a pop-out diagram is of the same type, for example, sunburst or icicle, as the larger diagram.

A "parent node" is a data node that encompasses one or more data nodes beneath it on one or more levels in a hierarchical structure. In a diagram of an organization based on divisions within the organization and in which each node within a division represents a person, a parent node represents a person having one or more people on one or more subordinate levels that report to her/him or to a subordinate of her/him.

A "child node" is a data node that is part of a greater node within a hierarchical structure. In a diagram of an organization based on divisions within the organization and in which each node within a division represents a person, a child node represents a person that reports to a person on a level immediately above the level of the child node.

A "hierarchical level," "reporting level," or just "level," is a positional grade within a chain of reporting within an organization. A "root level" of an organization is the highest level within an organization and is typically, but not necessarily, occupied by a single member, such as a chief executive officer (CEO), president, headmaster, principal, agency head, etc., depending on the organization at issue. A level will have at least one member having zero to any number of "reports," i.e., zero to any number of other members of the organization which that member is directly responsible for in the hierarchical chain. All levels except the lowest level within each hierarchical chain have at least one report.

A "lateral segment" is a partitioning of an organization into parts that have parallel reporting chains. Examples of lateral segments include, but are not limited to, corporate divisions, sister companies, agencies, departments, schools/colleges within a university, branches, etc.

A "node attribute" is data relating to a particular node and/or a person (i.e., organizational member) corresponding to the node. Node attributes can include, but not be limited to, hierarchical level, lateral segment, name, age, gender, position, geographic location, phone number, email address, member reported to, member(s) reporting to, compensation, tenure, job grade, compa-ratio, etc.

An "overlay" is a modification of a base diagram (including but not limited to a sunburst diagram and an icicle diagram) with other types of data, such as node attributes. It can also be a layer on top of the base structure with data. An overlay may include one or more visual cues, such as color, texturing, hatching, stippling, etc., to visually aid a user in understanding data represented in the base diagram.

Referring now to the drawings, FIG. 1 illustrates an exemplary IOVT system 100 that incorporates various aspects of the present invention. As will be seen, this embodiment provides a range of functionality, or tools, relevant to a particular type of organization. However, from this exemplary IOVT system 100 and from reading this entire disclosure, those skilled in the art will recognize that other functionalities (e.g., visualization tools) are possible with other types of organizations and/or other sets of data. Exemplary IOVT system 100 is implemented in an environment, here a global network environment 104, such as an Internet environment, but other IOVT systems incorporating tools and features disclosed herein may readily be implemented in other environments, such as a wide-area-network environment, a local-area-network environment, and a non-network environment, among others. In exemplary network environment 104, a portion of IOVT system 100 resides on one or more servers (a single web server 108 shown for convenience) and accesses one or more datastores (two datastores 112A and 112B shown for convenience) that contain organization data 116A and 116B, respectively, upon which the IOVT system operates to provide various tools, including the tools mentioned above and illustrated below. It is noted that two datastores 112A and 112B are shown simply for the purpose of illustrating the fact that the datastore(s) can be located on the same server(s) as IOVT system 100, located offboard such server(s), or both. When one or more datastores, such as datastore 112B, are located offboard of the server(s) on which IOVT system 100 is located, each may be located on one or more servers, such as server 120. In general terms, the location of the organizational data is inconsequential as long as IOVT system 100 can access it as needed.

Regarding the location(s) of the hardware of IOVT system 100 and datastores 112A and 112B, in one example in which the IOVT system is implemented as an enterprise system residing on an organization's own server(s), the IOVT system and its datastore(s) may reside on the organization's server(s). In another embodiment, IOVT system 100 may be implemented in a software-as-a-service (SaaS) model in which the IOVT system can reside on one or more web-servers owned by a third party (e.g., an SaaS provider or a lessor of server resources) and organizations can, for example, pay to utilize the IOVT system on an as-needed basis or a periodic access fee. In this example, each organization's organizational data can reside on that organization's server(s). If an organization's organizational data, such as data 116B is on its own server(s), such as server 120, then IOVT system 100 can access that data in a variety of ways. For example, IOVT system 100 may access data 116B in real time when the data is needed, such as at the beginning of a user-initiated session. In this example, data 116B can be temporarily stored on server 108, for example in memory 124. When the session is done, data 116B may be discarded. In another example, data 116B may be copied to memory 124 of server 108 and reside there as long as the organization remains a customer of the SaaS provider. While data resides on server 108, it can be updated as necessary, for example, periodically, in real time, or in response to a user initiating a session, among others, to ensure that that data is current.

Network environment 104 is shown as including a plurality of user machines 128(1) to 128(N), which one or more users (not shown) can use to access and interact with the portion of IOVT system 100 located on server 108. In this context, a "user machine" is any machine, such as a desktop computer, workstation, laptop computer, tablet computer, Internet appliance, smartphone, personal multimedia device (e.g., an IPAD® device available from Apple, Inc., Cupertino, Calif.), etc., that allows a user (not shown) to interact with IOVT system 100 and utilize the interactive software tools provided thereby. In the present example, each user machine 128(1) to 128(N) is shown as being in operative communication with server 108 via a cloud 132, which represents any one or more network and/or communications systems suitable for the particular instantiation of environment 104. For example, if a particular user machine 128(1) to 128(N) is a desktop computer and server 108 containing a portion of IOVT system 100 is a web server, cloud 132 can represent, for example, the Internet and a local-area network (LAN) that the user machine is connected to. As another example, if IOVT system 100 and each user machine 128(1) to 128(N) are parts of a site-specific enterprise system, cloud 132 can represent a LAN. As a further example, if a particular user machine 128(1) to 128(N) is a tablet computer or other mobile device, cloud 132 can represent, collectively, the Internet, a cellular communications network, and any other communications system(s), such as a cellular telephone/data network, needed to complete the communications path between that user machine and IOVT system 100. Though not particularly illustrated, those skilled in the art will readily appreciate that IOVT system 100 can be integrated into any one or more of user machines 128(1) to 128(N). Clearly, the possible environments for IOVT system 100 or a similar system incorporating various features of the present disclosure are myriad.

Each user machine 128(1) to 128(N) includes an interface 136(1) to 136(N) for interfacing with IOVT system 100 and allowing a user to interact with the IOVT system to generate user-desired visualizations of the organizational data of the organization of which that user is a part or is otherwise interested in. In one example, wherein server 108 is a web server, each interface 136(1) to 136(N) comprises a web browser suited to the particular type of user machine 128(1) to 128(N). For example, if a user machine is a desktop or laptop computer, the web browser may comprise a desktop type web browser. On the other hand, if a user machine is a mobile device, such as a tablet computer or smartphone, the web browser may comprise a mobile browser that optimizes a user's browsing experience for the mobile device. Each interface 136(1) to 136(N) may include suitable means, such as a web browser running JavaScript or any other suitable software code, for creating and displaying the appropriate IOVT visualization(s) 140(1) to 140(N) from visualization data 144 generated by IOVT system 100. As those skilled in the art will readily appreciate, a JAVA® software platform is merely exemplary, and any other visualization creating algorithm(s) can be used. Each interface 136(1) to 136(N) also includes and/or displays a user interface 148(1) to 148(N) that allows a user to make IOVT selections and/or input any one or more pieces of information for allowing IOVT system 100 to generate visualization data 144 and/or other data or information for conveying to the user of that interface.

Figure 2:
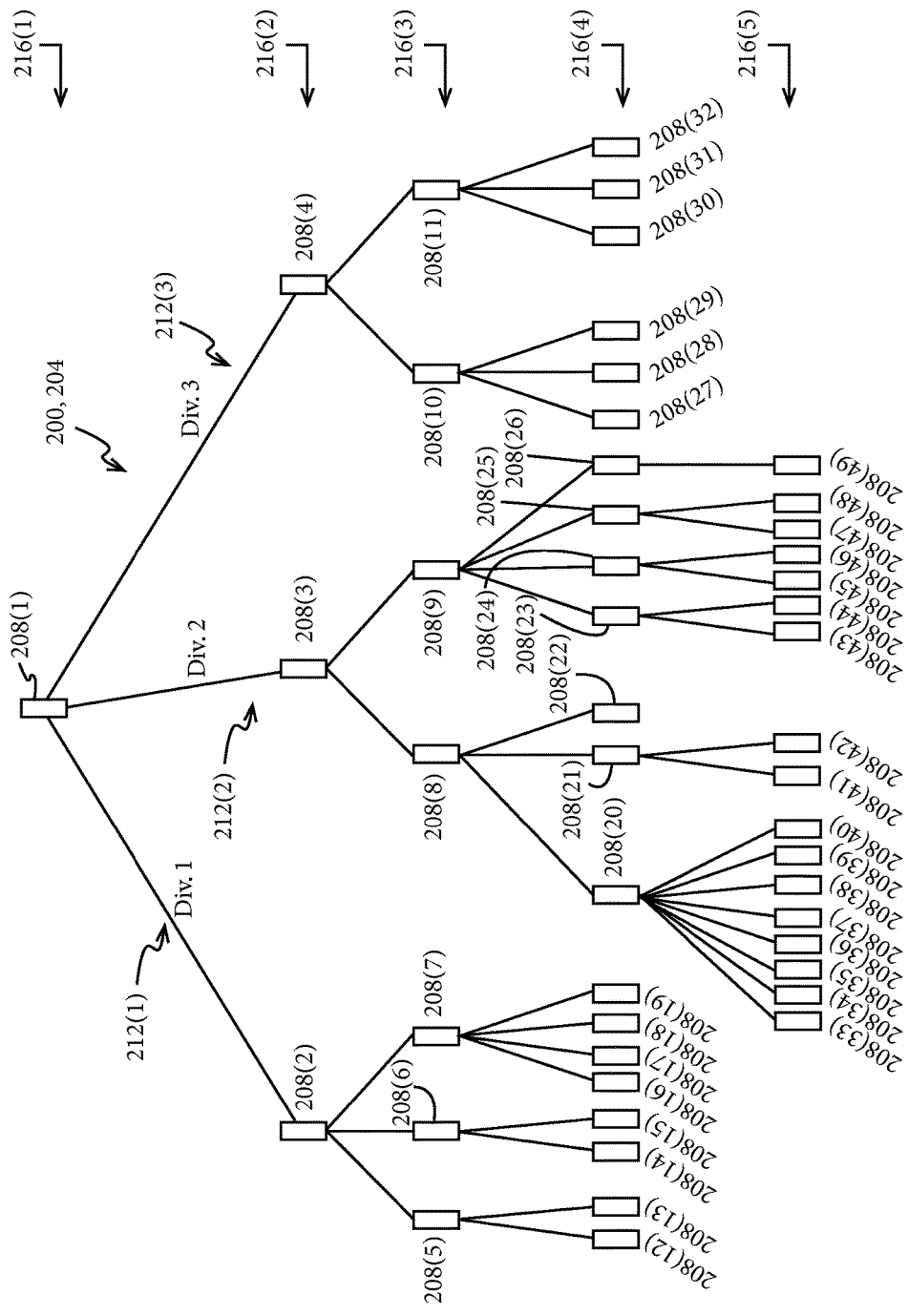
FIG. 2 is a conventional diagram illustrating a particular 49-member organization.

Some of the data visualizations that IOVT system 100 can be configured to provide to any of user machines 128(1) to 128(N) upon request of a user include sunburst diagrams and icicle diagrams, which can convey a variety of information to the user. As an illustration, FIG. 2 is a conventional organizational diagram 200 of an organization 204 having 49 members 208(1) to 208(49) in three lateral segments 212(1) to 212(3), and on as many as five levels 216(1) to 216(5), depending on the depth of the hierarchy along any particular chain within the hierarchy. As those skilled in the art will readily appreciate, lateral segments 212(1) to 212(3) can represent any lateral segments, such as corporate divisions, sister companies, agencies, departments, schools/colleges within a university, branches, etc. Similarly, levels 216(1) to 216(5) can represent any type of level within a particular organization, such as CEO, president, headmaster, vice president, department head, professor, assistant professor, volunteer, low-level worker, etc. Fundamentally there are no limits on the types of lateral segments and levels that lateral segments 212(1) to 212(3) and levels 216(1) to 216(5) can respectively represent. Organization 204 of FIG. 2 is used immediately below to illustrate not only some exemplary diagrams that an IOVT system, such as IOVT system 100 of FIG. 1, can be configured to generate, but also to explain and provide an example of how the organizational data underlying an organization can be abstracted to make the rendering of visualizations by the IOVT system.

FIG. 3A illustrates a general configuration of an exemplary sunburst diagram 300 based on the organizational data underlying organization 204 of FIG. 2, and FIG. 4A illustrates a general configuration of an exemplary icicle diagram 400 based on the same data. Referring first to FIG. 3A, sunburst diagram 300 is composed of the same hierarchical levels 216(1) to 216(5) of organization 204 of FIG. 2, starting with a root level 216(1) and proceeding down through four subordinate levels 216(2) to 216(5) in the hierarchy, with each subordinate level being subordinate to the level immediately above it. In other sunburst diagrams, the number of levels can be greater or fewer than five, depending on the structure of each organization or component thereof being represented by a particular sunburst diagram. In addition to this hierarchical structure, sunburst diagram 300 is optionally segmented laterally into the three lateral segments 212(1) to 212(3) of organization 204 of FIG. 2.

In one example wherein organization 204 of FIG. 2 is a corporation, each level 216(1) to 216(5) corresponds to a reporting level, or positional grade, within the corporation and each lateral segment 212(1) to 212(3) corresponds to a division within the corporation. In the context of the present example and referring to FIG. 3A and also FIG. 2 as noted: root level 216(1) contains a node 304(1) that corresponds to the corporation's chief executive officer (CEO) (i.e., member 208(1) of FIG. 2); level 216(2) contains 3 nodes 304(2) to 304(4) that correspond respectively to division heads of the 3 divisions 212(1) to 212(3) (i.e., members 208(2) to 208(4) of FIG. 2); level 216(3) contains 7 nodes 304(5) to 304(11) that correspond to mid-level managers within the various divisions (i.e., members 208(5) to 208(11) of FIG. 2); level 216(4) contains 20 nodes 304(12) to 304(32) that represent subordinates to the mid-level managers on level 216(3) (i.e., members 208(12) to 208(32) of FIG. 2); and level 216(5) contains 18 nodes 304(33) to 304(49) (i.e., members 208(33) to 208(49). In this example, only division 212(2) has all five levels 216(1) to 216(5), such that nodes 304(20), 304(21) and 304(23) to 304(26) are lower-level managers and all 18 nodes 304(33) to 304(49) report to various ones of these mid-level managers.

Icicle diagram 400 of FIG. 4A also represents organization 204 of FIG. 2. Consequently, icicle diagram 400 has the 5 hierarchical levels 216(1) to 216(5) of organization 204, again with level 216(1) being the root level, along with the 3 lateral segments 212(1) to 212(3) of that organization. Just like sunburst diagram 300 of FIG. 3A, icicle diagram 400 of FIG. 4A has the following distribution of the same 49 nodes 304(1) to 304(49): root level 216(1) contains a node 304(1) that corresponds to the corporation's chief executive officer (CEO) (i.e., member 208(1) of FIG. 2); level 216(2) contains 3 nodes 304(2) to 304(4) that correspond respectively to division heads of the 3 divisions 212(1) to 212(3) (i.e., members 208(2) to 208(4) of FIG. 2); level 216(3) contains 7 nodes 304(5) to 304(11) that correspond to mid-level managers within the various divisions (i.e., members 208(5) to 208(11) of FIG. 2); level 216(4) contains 20 nodes 304(12) to 304(32) that represent subordinates to the mid-level managers on level 216(3) (i.e., members 208(12) to 208(32) of FIG. 2); and level 216(5) contains 18 nodes 304(33) to 304(49) (i.e., members 208(33) to 208(49). In this example, only division 212(2) has all five levels 216(1) to 216(5), such that nodes 304(20), 304(21) and 304(23) to 304(26) are lower-level managers and all 18 nodes 304(32) to 304(49) report to various ones of these mid-level managers.

As can be readily appreciated from exemplary diagrams 300 and 400 of FIGS. 3A and 4A, respectively, that even with only 49 nodes 304(1) to 304(49) corresponding to a corporation having 49 members, the diagrams can be somewhat cluttered and visually complex when attempting to show all of the nodes in the diagrams. Many organizations wherein visualization tools of the present disclosure are useful, such as large corporations, national voluntary organizations, governments, etc., will typically have far more than 49 nodes (members), with members numbering into the thousands, tens of thousands, even hundreds of thousands or more. One can envision how cluttered a sunburst or icicle diagram that represents a 100,000-member organization would be, not to mention the time and/or processing power it would take to render all of those nodes individually in the diagram, if they could all be rendered appropriately in the first place, given screen size, resolution, and other constraints, such as browser memory, visualization constraints, etc. Regarding this last point, some contemporary web browsers have a limit to the number of nodes that can be rendered, such as 5,000 to 10,000 nodes. Therefore, for example, rendering all nodes of a 70,000-node (member) organization would not be possible with such a browser.

One way an IOVT system of the present disclosure, such as IOVT system 100 of FIG. 1, can simplify organization-visualization diagrams, for example, sunburst and icicle diagrams, is to use one or more node-abstraction algorithms, such as node-abstraction algorithm 152 of FIG. 1, a copy of which, in this example, resides on each of user machines 128(1) to 128(N) as an applet or script that runs on the corresponding user interface 136(1) to 136(N), which again may be a web browser. In other embodiments, the node-abstraction algorithm(s) can be implemented differently and/or be located in another location. For example, in a standalone implementation of an IOVT system, the node-abstraction algorithm(s) may reside in an IOVT application that also provides its own user interface and generates its own user interfaces on a standalone machine. In another example, the node-abstraction algorithms(s) may reside on a server and push abstracted-node information to the requesting one of user machines 128(1) to 128(N). Those skilled in the art will understand that still other embodiments are possible.

Node-abstraction algorithm 152 operates on a full data set 156 that contains data for all of the nodes that could possibly be rendered for a particular organization in a manner that reduces the number of nodes displayed to provide for efficient and effective visual rendering on the appropriate user machine 128(1) to 128(N). By "full data set" it is meant that the data set includes node-attribute data on every currently active node (representing current members (e.g., direct employees, contract employees, etc., of an organization), and in some cases, currently inactive nodes (representing currently non-active members (e.g., former employees) of the organization), if any. "Node-attribute data" can include, but not be limited to, categorical attributes (e.g., geography, nationalities, sex, direct/indirect, compensation tertile, performance, and termination type, among others) and numerical attributes (e.g., job grade, age, span of control, tenure, comp ratio, and attrition, among others), and any combination thereof.

Full data set 156 can be organized in any suitable manner. For example, full data set 156 can be organized in a node table, with rows of the table corresponding to individual nodes and columns corresponding to node attributes. In some embodiments, full data set 156 may optionally include one or more supplementary tables, for example, lookup tables (not shown) that contain full data represented in shorthand in the node table. For example, if a location country is represented by numerical or other codes in the node table 400, one of the lookup tables could be a table that relates the full country names to the codes. Then, if a visualization diagram is to display country names of an organization's members, a rendering algorithm of a corresponding interface would use the code and the lookup table to find and then display the full country names. In a server/web-browser context, full data set 156 can be stored and/or assembled on server 108 and communicated to a requesting one of interfaces 136(1) to 136(N) on user machines 128(1) to 128(N) via cloud 132 using any suitable communications protocol(s).

Figure 5:
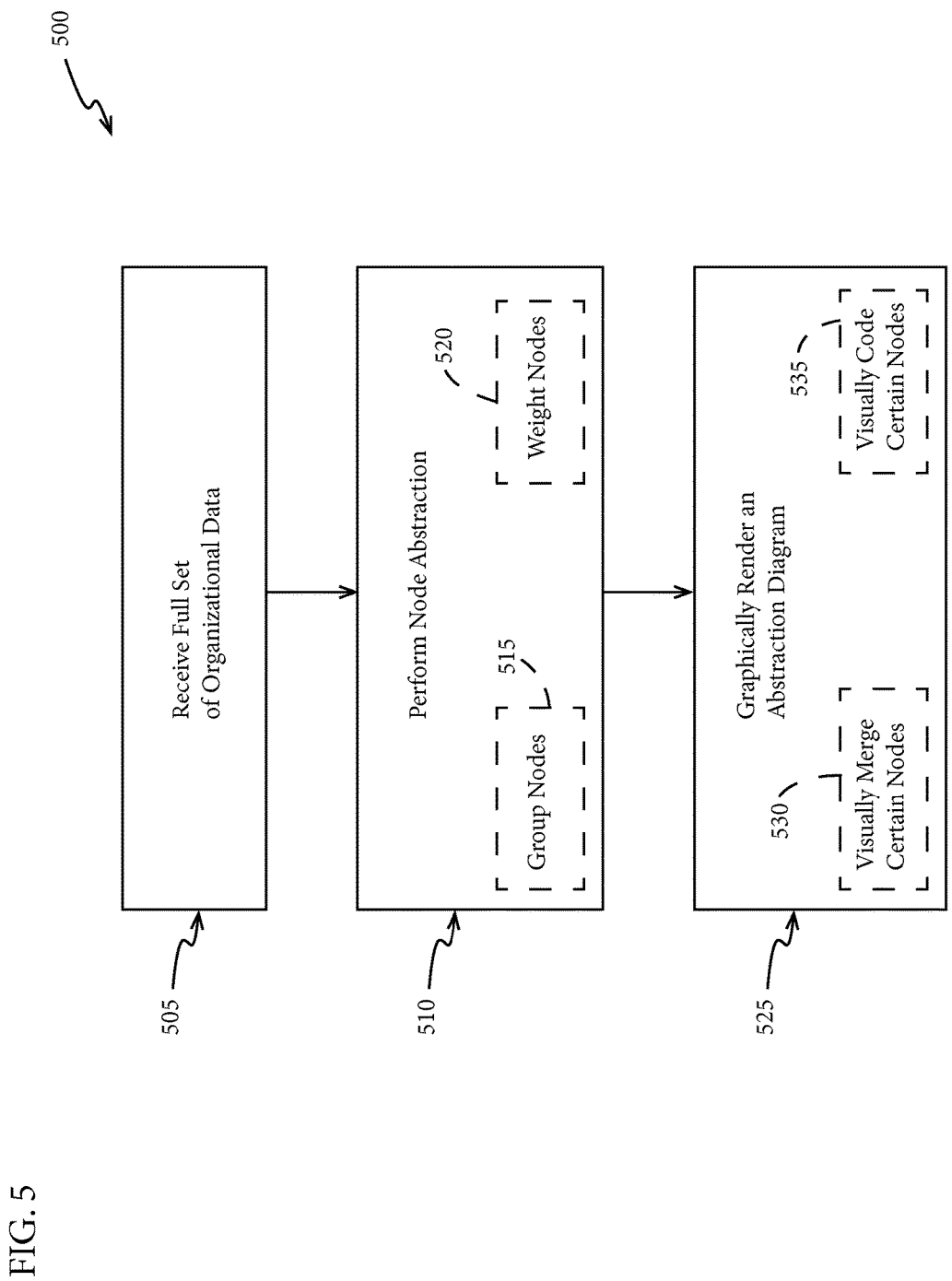
FIG. 5 is a flow diagram illustrating a method of displaying organizational data to a user.

FIG. 5 illustrates an exemplary method 500 of displaying an abstracted-node organizational diagram, such as abstracted-node sunburst diagram 350 of FIG. 3B and abstracted-node icicle diagram 450 of FIG. 4B. Referring to FIG. 5, at step 505, a full data set of organizational data, such as full data set 156 of FIG. 1, is received in any suitable manner. As described above, a full data set contains data representing all of the members (nodes) of an organization and, if visually represented in a suitable diagram, would require each and every node to be rendered. As also noted, the full data set may reside in one or more machine data files. At step 510, node abstraction is automatically performed on the full data set to reduce the number of nodes that need to be rendered to create a visual diagram. An output of node-abstraction at step 510 is abstracted-node data, which contains a set of nodes that will virtually always include at least one consolidated node. As used herein and in the appended claims, a "consolidated node" means a node that represents a plurality of non-abstracted nodes in the original full data set. As described below, a consolidated node can be created by grouping together related ones of the non-abstracted nodes in the full data set. Node abstraction at step 510 may be performed using one or more node-abstraction algorithms, such as node-abstraction algorithm 152 of FIG. 1, executed in one or more machines, such as any one or more of user-machines 128(1) to 128(N) and/or any one or more of servers 108 of FIG. 1.

Figure 6A:
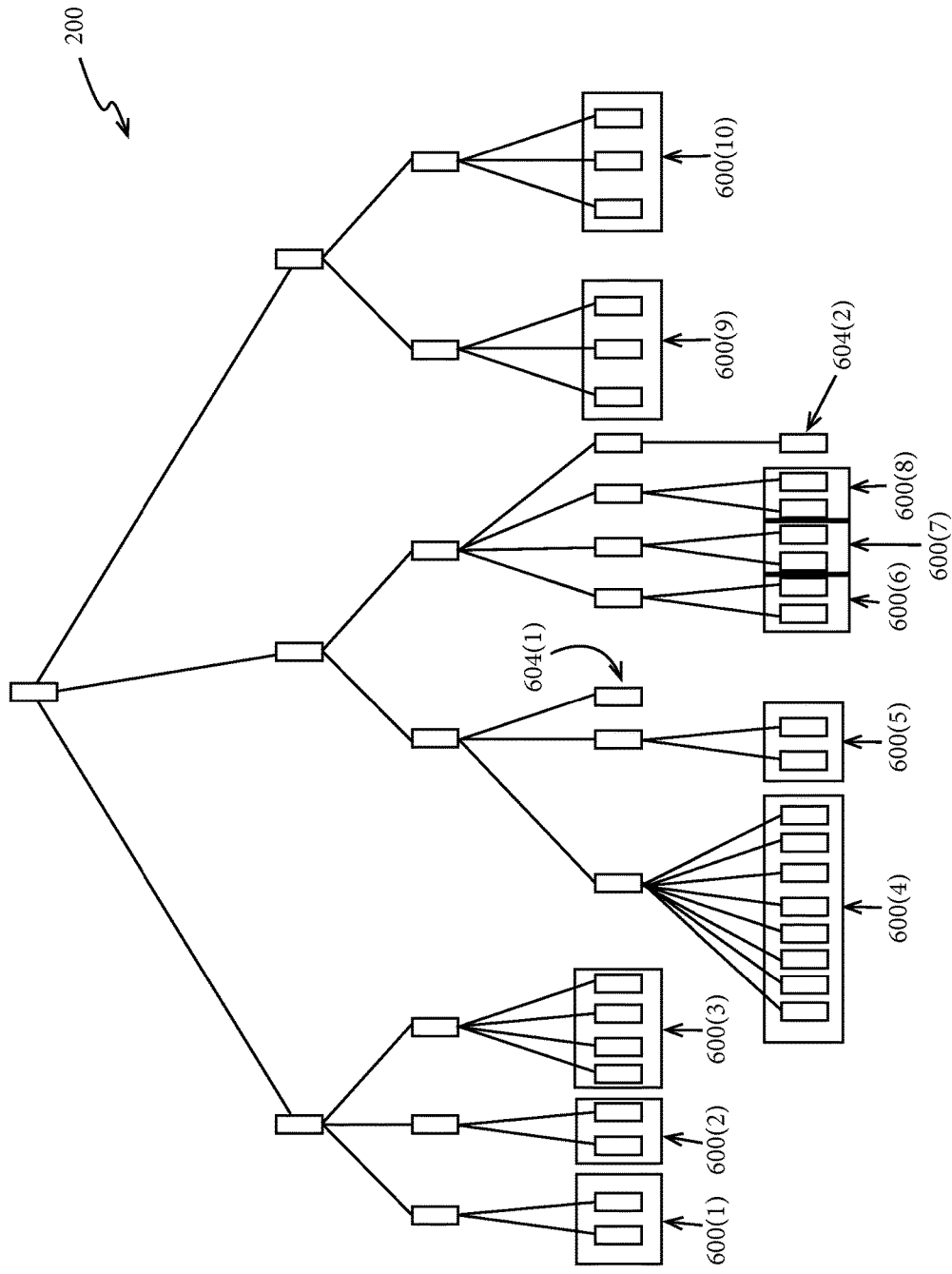
FIGS. 6A to 6E are diagrams representing an exemplary node abstraction algorithm applied to the 49-member organization of FIG. 2.
Figure 6B:
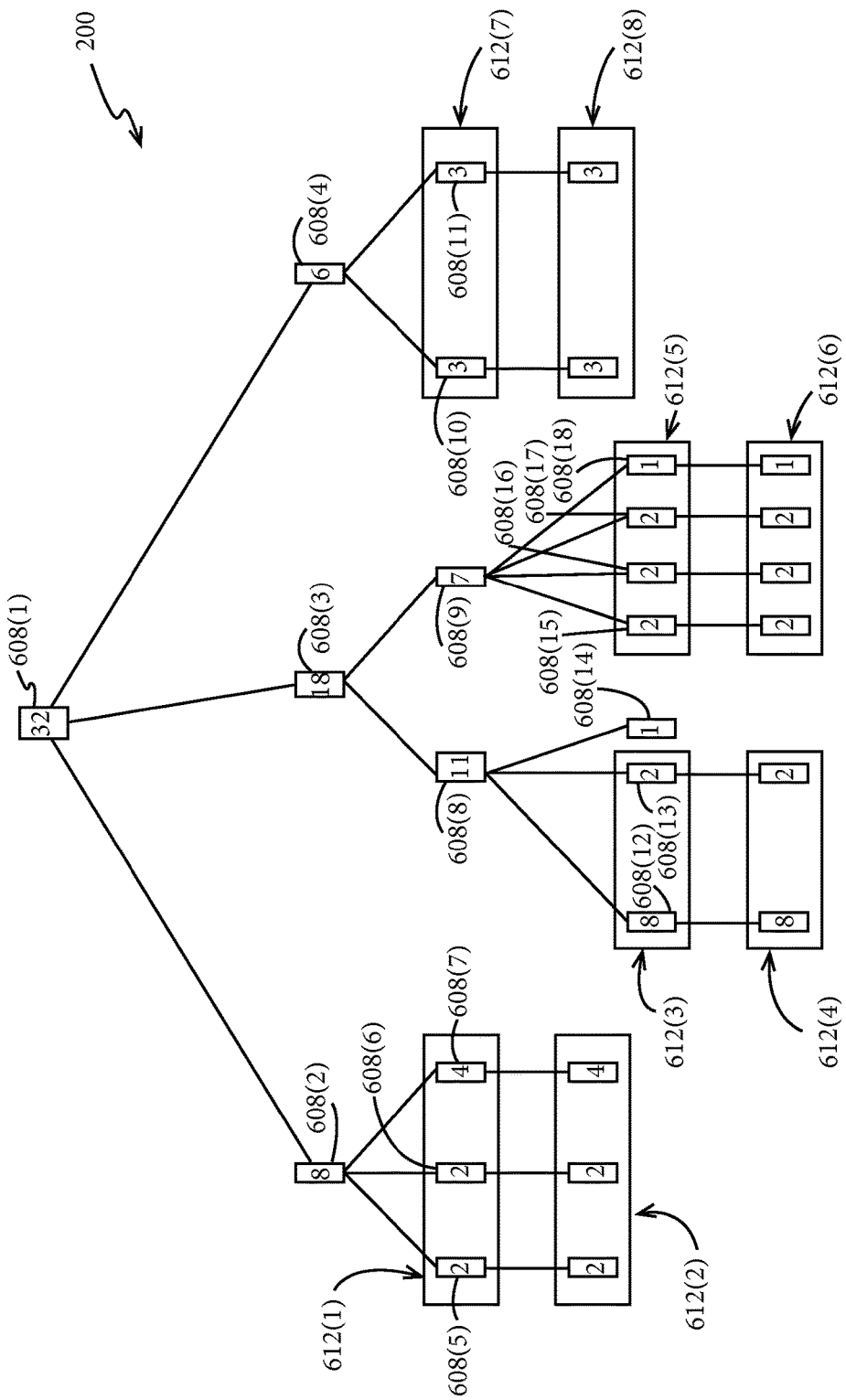

As illustrated in FIG. 5, in one example node abstraction at step 510 may be considered to include two sub-steps, namely a node-grouping step 515 and a node-weighting step 520. At node-grouping step 515, the node-abstraction algorithm performs the grouping of related nodes. FIGS. 6A to 6E repeat organizational diagram 200 of FIG. 2 in differing abstracted states and include corresponding respective icicle diagrams and are used herein to illustrate an exemplary node-abstraction algorithm. Referring first to FIG. 6A, this figure repeats organizational diagram 200 of FIG. 2 without modification, but shows how childless nodes (a/k/a leaves) are initially grouped, as indicated by the boxes representing consolidated nodes 600(1) to 600(10). Each set of childless nodes having a common report-node in the immediate next level up in the hierarchy are grouped together to form a corresponding one of consolidated nodes 600(1) to 600(10). If a particular parent node has only a single childless node, then that childless node remains ungrouped. Referring to FIG. 6B, in conjunction with grouping these sets of childless nodes, at node-weighting step 520 the abstraction algorithm assigns a weight to each consolidated node 600(1) to 600(10) and to any remaining ungrouped nodes, such as childless nodes 604(1) and 604(2). In one example, each non-abstracted node is assigned a weight of 1, and when a set of childless nodes are grouped into a consolidated node, the consolidated node is assigned a weight equal to the number of nodes in the group. Consequently, in this example consolidated nodes 600(1) to 600(10) are assigned weights of 2, 2, 4, 8, 2, 2, 2, 2, 3, and 3.

FIG. 6B also illustrates how weights are assigned to parent nodes 608(1) to 608(18) at step 520 of FIG. 5 in this example. For each parent node having immediate child nodes that are childless, after the step of grouping childless nodes per FIG. 6A, the weighting algorithm assigns a weight to that parent node that is the sum of the weights of the immediate child nodes, whether they are consolidated or not. This weighting scheme continues up each hierarchical chain to the root node 608(1).

Figure 6C:
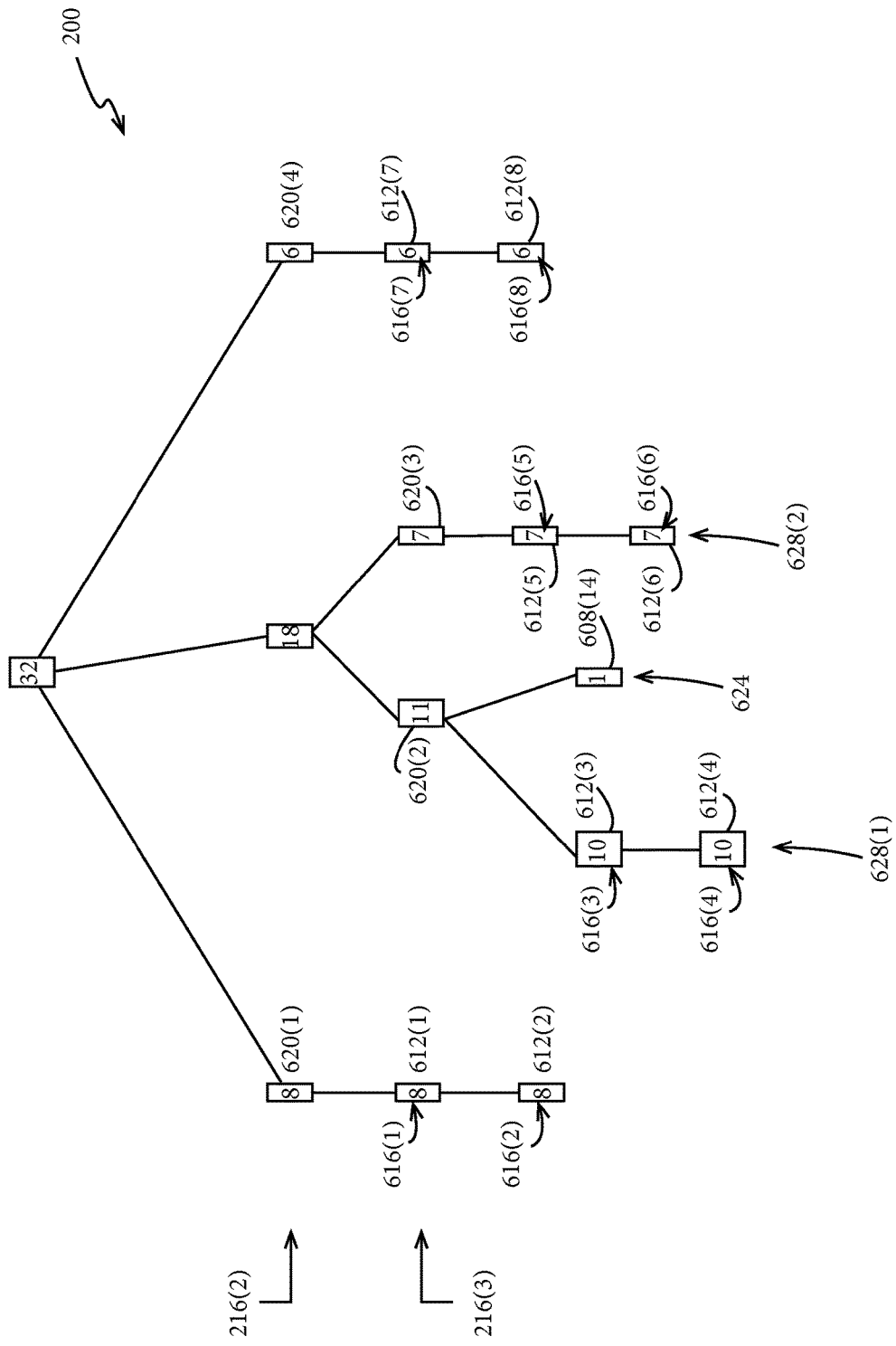
Figure 6D:
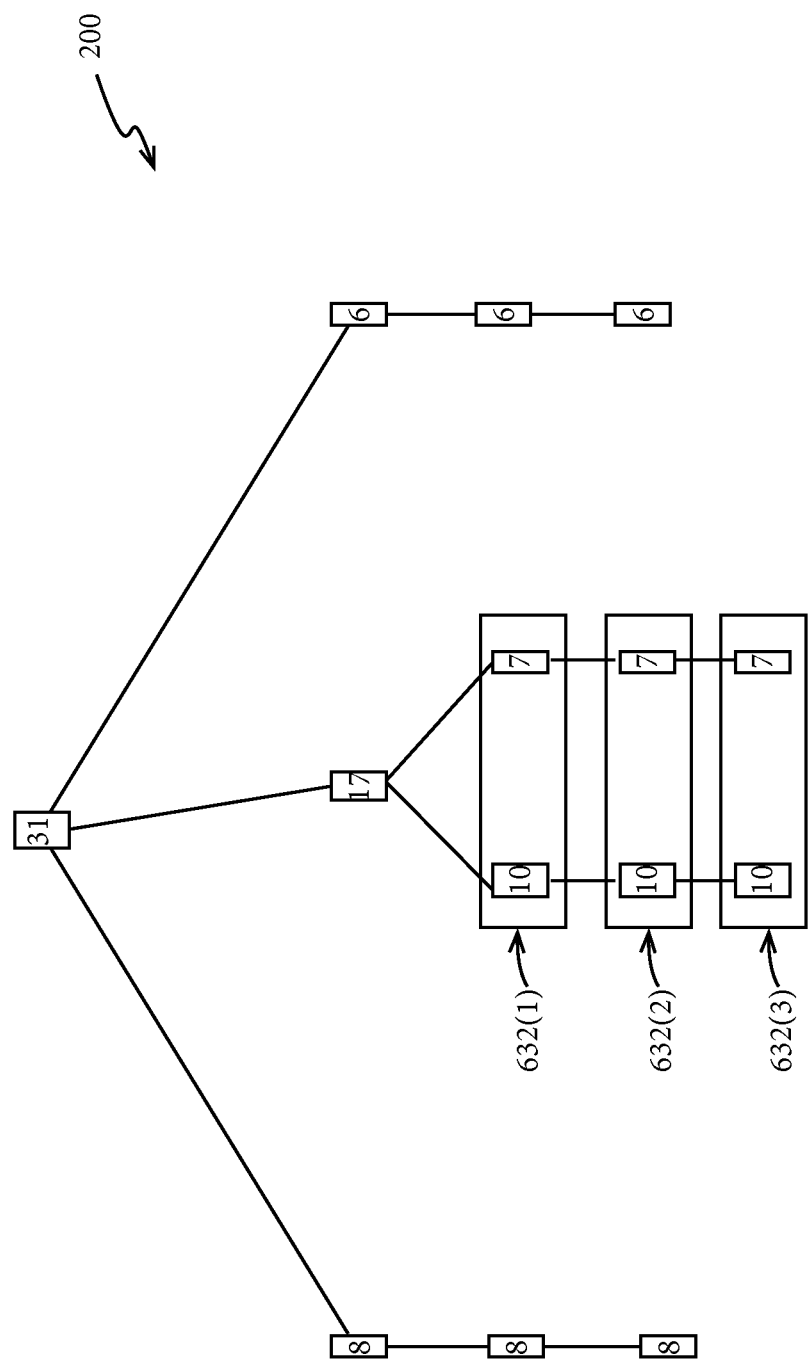

FIG. 6B further illustrates a second round of grouping of childless nodes, as illustrated by consolidated nodes 612(1) to 612(8). Correspondingly, FIG. 6C illustrates consolidated nodes 612(1) to 612(8) along with their corresponding weights 616(1) to 616(8). In this abstraction, because the initial consolidation of childless nodes on the lowest levels results in all of the nodes on the immediate parent node levels having only a single child node, the abstraction depicted in FIGS. 6B and 6C looks up to the lowest level(s) at which a parent node has two or more child nodes that can be grouped. In this example, these parent nodes 620(1) to 620(4) appear on level 216(2) for parent nodes 620(1) and 620(4) and on level 216(3) for parent nodes 620(2) and 620(3). It is noted that abstracted organizational diagram 200 of FIG. 6C shows an ungrouped childless node 608(14) on a chain 624 that is shorter than two adjacent chains 628(1) and 628(2). In this example, the node-abstraction algorithm performed at step 510 of method 500 simply eliminates node 608(1), as seen in FIG. 6D. Correspondingly, at step 520 of method 500 (FIG. 5), the node-abstraction algorithm changes the weight of the immediate parent node, as well as each of the nodes up hierarchical chain 628(1). It is noted that while this sort of node paring is performed in this example, in other instantiations of node-abstraction algorithms, this paring need not be performed.

Figure 6E:
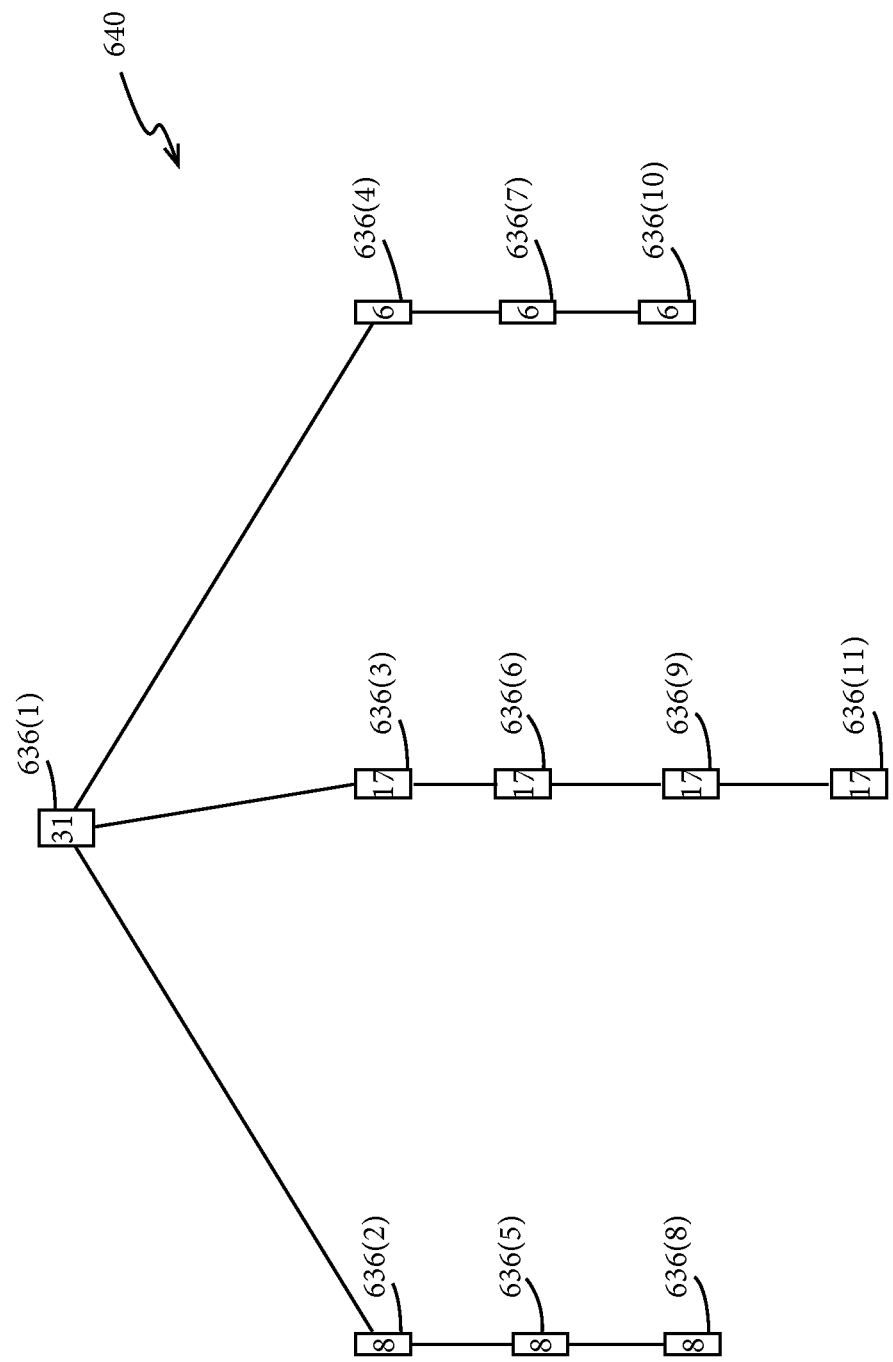

As a final step of node-grouping at step 515 of method 500 of FIG. 5, and as seen in FIG. 6D, the node-abstraction algorithm creates consolidated nodes 632(1) to 632(3). The resulting fully abstracted version of organizational diagram 200 is shown in FIG. 6E, which is represented in abstraction sunburst and icicle diagrams 350 and 450 of FIGS. 3B and 4B, respectively. It is noted that the node-grouping and weighting procedures just described above are merely exemplary and that other node-grouping and weighting procedures can be used.

As can be seen in FIG. 6E, with the particular 49-member organization 204 represented in organizational diagram 200, the application of the node-abstraction at step 510 of method 500 of FIG. 5 results in the 49-member organization abstracting down to 11 abstracted nodes 636(1) to 636(11), which is about 22% of the original 49 nodes, i.e., members 208(1) to 208(49) (FIG. 2). Consequently, rendering abstraction 640 of FIG. 6E in lieu of rendering all 49 nodes of the non-abstracted organization is more efficient. As a result of the weighting at weighting step 520 of method 500 of FIG. 5, the rendered abstraction diagram, such as either of sunburst and icicle diagrams 350 and 450 of FIGS. 3B and 4B, has nearly the same visual character as a corresponding non-abstracted diagram, such as either of sunburst and icicle diagrams 300 and 400 of FIGS. 3A and 4A.

As can be readily seen by comparing FIG. 3B with FIG. 3A and FIG. 4B with FIG. 4A, the 49 nodes 208(1) to 208(49) of FIG. 2 have been abstracted to 11 abstracted nodes 636(1) to 636(11) (FIG. 6E), and, similarly, the same 49 nodes of FIG. 3A have been abstracted to the same 11 abstracted nodes (FIG. 3B). Consequently, the number of nodes that need to be rendered in a visualization of each of abstracted-node sunburst diagram 350 and abstracted-node icicle diagram 450 is reduced by about 78%. The present example of FIGS. 3A, 3B, 4A, and 4B was contrived to have a relatively small number of nodes to make the illustration reasonable. In many real-world implementations of an IOVT system of the present disclosure, the number of nodes at issue will be thousands or more, making node abstraction more significant and higher impacting, especially for organizations having relatively large numbers of childless nodes that report to a relatively small number of nodes on the level immediately above the childless nodes. In some implementations, node-abstraction for particular organizational structures will result in larger reductions of nodes that need to be rendered, such as 60% to 95% reduction. Because the number of abstracted nodes is smaller than the number of non-abstracted nodes, the amount of abstraction data (not shown) is less than the full-node-set data 116A and 116B that would be needed to render all nodes of the diagram. Reducing the amount of data needed to render a useful data visualization diagram can not only reduce the amount of time and computing resources needed to perform the rendering, but, depending on how the IOVT system is implemented, can also reduce the amount of data needed to be communicated from the IOVT system to the corresponding user machine(s).

In the implementation illustrated in the examples of FIGS. 3A, 3B, 4A, and 4B, abstraction algorithm 152 of FIG. 1 uses the full set of 49 nodes 208(1) to 208(49) (FIG. 2) to generate abstracted-node data 156 on the requesting one of user machines 128(1) to 128(N) to create the selected one of abstracted-node diagrams 350 and 450 of FIGS. 3B and 4B. In this context, a "requesting one" of user machines 128(1) to 128(N) is one of these user machines from which a user has requested a particular visualization diagram from IOVT system 100. Abstracted-node data 156 is data that the corresponding one of interfaces 136(1) to 136(N) of the requesting one of user machines 128(1) to 128(N) uses to render the visualization of the diagram.

Any abstraction algorithm(s) used, such as node-abstraction algorithm 152 of FIG. 1, can be configured so that the resulting abstracted visualization has any desired visual character. For example, abstraction algorithm 152 is configured so that the abstracted-node diagram has the same overall visual character as the corresponding non-abstracted node diagram. Compare, for example, FIG. 3B versus FIG. 3A and FIG. 4B versus FIG. 4A. In these examples, it is seen that the height (radial for sunburst diagrams 300 and 350, and vertical for icicle diagrams 400 and 450) of each level 216(1) to 216(5) within each diagram type is the same as other levels in that diagram type and that the width (circumferential for the sunburst diagrams, and horizontal for the icicle diagrams) of lateral segments 212(1) to 212(3) is proportional to the number of nodes (and organization members) in that segment, here a division of the corporation. The proportional width of lateral segments 212(1) to 212(3) give a user a quick visual impression of the sizes of the differing divisions in terms of its members.

While the exemplary diagrams 300, 350, 400, and 450 of FIGS. 3A, 3B, 4A, and 4B show constant-height levels 216(1) to 216(5) and proportional-width lateral segments 212(1) to 212(3), in other instantiations the heights in any given diagram can be different from one another and the widths can be determined other than proportionally. In one example, the heights of the levels may be determined by hierarchical position within the hierarchy, such that the lowest level at the bottom of the hierarchy has the smallest height, representing the lowest-level positions within the organization, and higher levels have increasingly larger heights to signify increasing responsibilities within the organization. In another example, the height of each level may be determined by the proportion of the number of non-abstracted nodes (organization members) on that level relative to the overall number of non-abstracted nodes in a corresponding lateral segment or the entire organization. Similarly, the widths of the lateral segments within a particular diagram can be determined in a manner other than proportionately. For example, the widths may be equal across all of the lateral segments. Those skilled in the art will appreciate that there are a variety of ways that the heights of levels and/or widths of lateral segments can be determined, including the ways noted above.

Returning to display method 500 of FIG. 5, the result of node abstraction at step 510 is abstraction data that contains the consolidated nodes, as well as any unconsolidated nodes that may be present. The abstraction data further includes the node weighting that also results from step 510. At step 525, this abstraction data is used to graphically render an abstraction diagram, such as an abstraction sunburst diagram or an abstraction icicle diagram, among others. Examples of such abstraction diagrams have been described above relative to FIGS. 3B and 4B. Any suitable software code, such as a JAVA® applet or script (e.g., in a web-browser context), or code written in any other suitable programming language is appropriate for the corresponding context. Those skilled in the art will understand the various graphical rendering options available, along with the format of the input data needed for those options, such that further explanation is not necessary for them to understand how to implement and use the methodologies and functionalities described herein.

Depending on the desired appearance of the diagram rendered at step 525, one or more rendering sub-steps can be taken within the overall rendering step 525. For example, if it is desired that the rendered diagram show only the lateral segments of the organization, at step 530 all of the nodes to be rendered within each lateral segment can be visually merged together, such that when rendered, each lateral segment appears as a continuous, unbroken shape. Examples of this visual merging of lateral segments are shown as visually merged abstraction sunburst and icicle diagrams 370 and 470 of FIGS. 3C and 4C, respectively. As can be seen by comparing FIG. 3C with FIG. 3B, the borders 354 (FIG. 3B) between individual abstraction nodes in abstraction sunburst diagram 350 of FIG. 3B are eliminated in visually merged abstraction sunburst diagram 370 of FIG. 3C, and only segment borders 358 remain. Similarly relative to FIGS. 4C and 4B, the borders 454 (FIG. 4B) between individual abstraction nodes in abstraction sunburst diagram 450 of FIG. 4B are eliminated in visually merged abstraction sunburst diagram 470 of FIG. 4C, and only segment borders 458 remain. As those skilled in the art will readily understand, this visual merging can be achieved by selectively rendering the borders of the cells that represent the nodes without certain border lines or with border lines having the same visual character as the visual fill within those cells.

In addition and depending on the desired appearance of the rendered diagram, rendering step 525 of FIG. 5 may further include a visual coding step 535 in which individual nodes are visually coded to convey any of a variety of information to a user. For example, in the visual merging example described above for visually merging of lateral segments, the lateral segments can be colored differently from one another or may be visibly distinguishable from one another in some other way, such as by filling with differing hatching or other fill. As another example, individual abstraction nodes can be shaded or otherwise visually graded according to a scalable attribute associated with the nodes. Several visual coding examples are described below.

Figure 7:
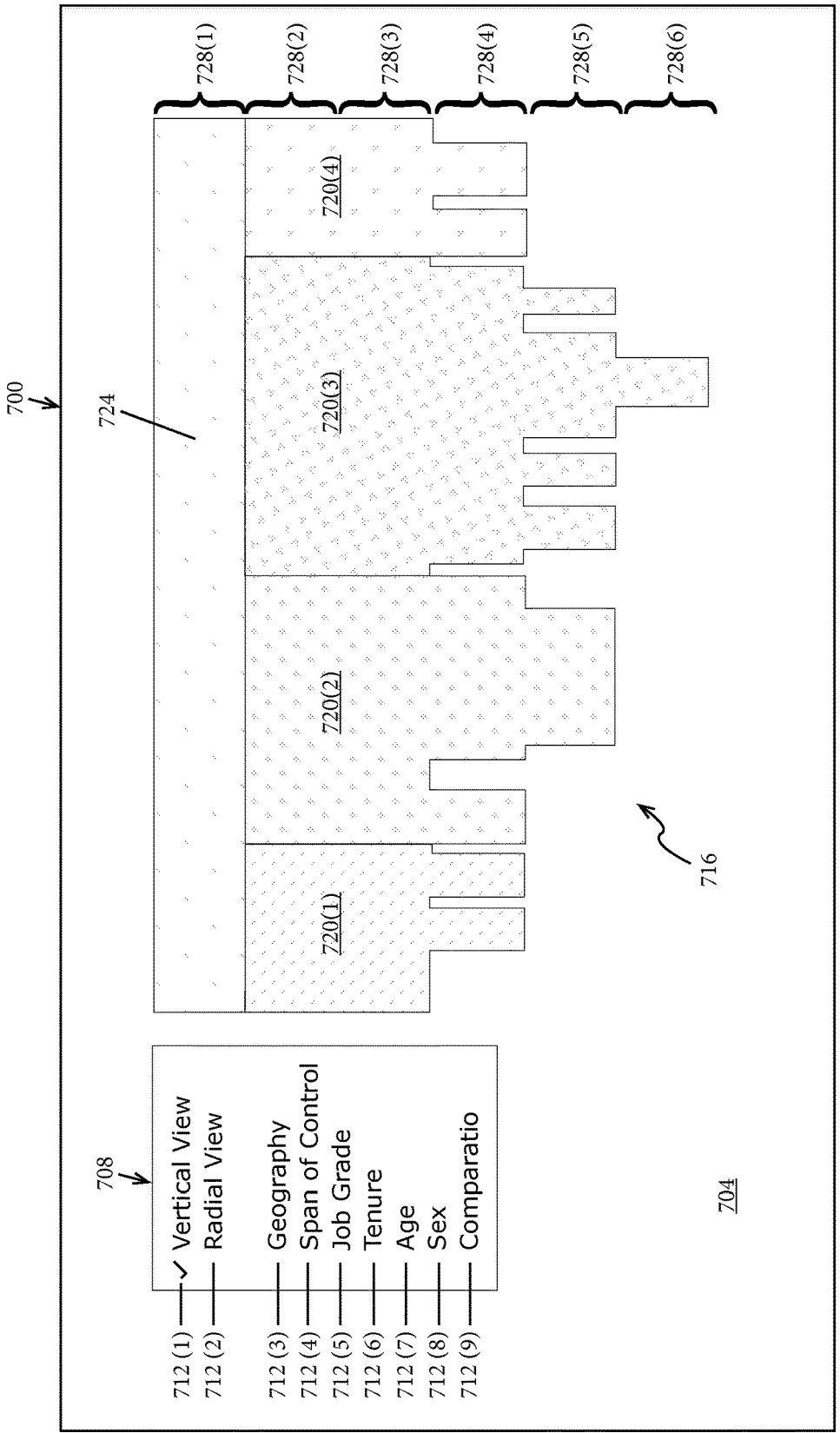
FIG. 7 is a simulated screenshot of a user interface displaying an icicle diagram representing an organization having 276 members, wherein the diagram is in a fully abstracted state having nodes within lateral-segments visually merged.

While the foregoing describes underlying abstracting and associated rendering methodologies and exemplary environments, FIGS. 7 to 14 illustrate examples of visualization tools that can be made using those underlayments. Referring first to FIG. 7, this figure shows an illustrative screenshot 700 of a user interface 704 of an IOVT system, such as IOVT system 100 of FIG. 1. In that context, user interface 704 could correspond to any one of user interfaces 148(1) to 148(N) of FIG. 1. As seen in FIG. 7, user interface 704 includes a menu 708 that includes a plurality of selections 712(1) to 712(9). Selections 712(1) and 712(2) are selections that allow a user to select the type of diagram to be displayed. In this example, selection 712(1) and 712(2) are for a Vertical View diagram (a/k/a "icicle diagram") and a Radial View diagram (a/k/a "sunburst diagram"), respectively. FIG. 7 shows Vertical View selection 712(1) selected, and the result is that user interface 704 displays an icicle diagram 716 for the subject organization. Icicle diagram 716 may be rendered in accordance with rendering method 500 of FIG. 5 or similar rendering method.

In the example of FIGS. 7 to 14, the subject organization is a company having 276 total employees, four divisions (i.e., lateral segments 720(1) to 720(4) of icicle diagram), and one CEO that oversees the four divisions. The distribution of employees among the divisions is as follows: division 720(1) contains 38 employees; division 720(2) contains 66 employees; division 720(3) contains 138 employees; and division 720(4) contains 33 employees. As can be readily seen from icicle diagram 716, the particular rendering is a visually merged diagram in which the individual abstracted nodes (not shown) in each division 720(1) to 720(4) are visually merged with one another so that each division is represented by a single continuous shape. In addition, it is noted that the differing stippling among divisions 720(1) to 720(4) is used in this example to indicate differing colors used to provide further visual distinction among the divisions. The particular colors used are not important, but typically they are selected to be different enough to provide suitable visual distinction among divisions 720(1) to 720(4), and also the CEO node 724, which is also stippled in this example to indicate another color. It is noted that the sizes of divisions 720(1) to 720(4) are proportional to the number of employees they contain. This is due to the weighting performed during the abstraction process.

In this exemplary organization of 276 employees, there are six levels 728(1) to 728(6), though some hierarchical chains extend to only third level 728(3). It is noted that in the visually merged icicle diagram of FIG. 7, the vertical extents of levels 728(1) to 728(6) are not specifically indicated, though in other embodiments they can be. However, in the present example, all of levels 728(1) to 728(6) have the same height so that the levels can be fairly readily distinguished from one another, despite the visual merging.

Returning to menu 708, selections 712(3) to 712(9) are for applying attribute-visualization tools that allow a user to select which attribute they would like icicle diagram 716 to visually highlight. In this example, selections 712(3) to 712(9) allow the user to modify icicle diagram 716 to group and highlight employees, either individually or in aggregates: 1) by their geographical location (Geography selection 712(3)); 2) by their span of control, i.e., by how many employees they directly supervise, (Span of Control selection 712(4)); 3) by job grade (Job Grade selection 712(5)); 4) by their tenure with the company (Tenure selection 712(6)); 5) by their age (Age selection 712(7)); 6) by their gender (Sex selection 712(8)); and 7) by their comp-ratio, i.e., the ratio between their compensation and the average compensation for their position (Compa-ratio selection 712(9)). In other embodiments, more, fewer, and/or different selections may be provided to suit a particular usage of the corresponding IOVT system. Examples of implementation of some of these selections and other tools are described below.

Figure 8:
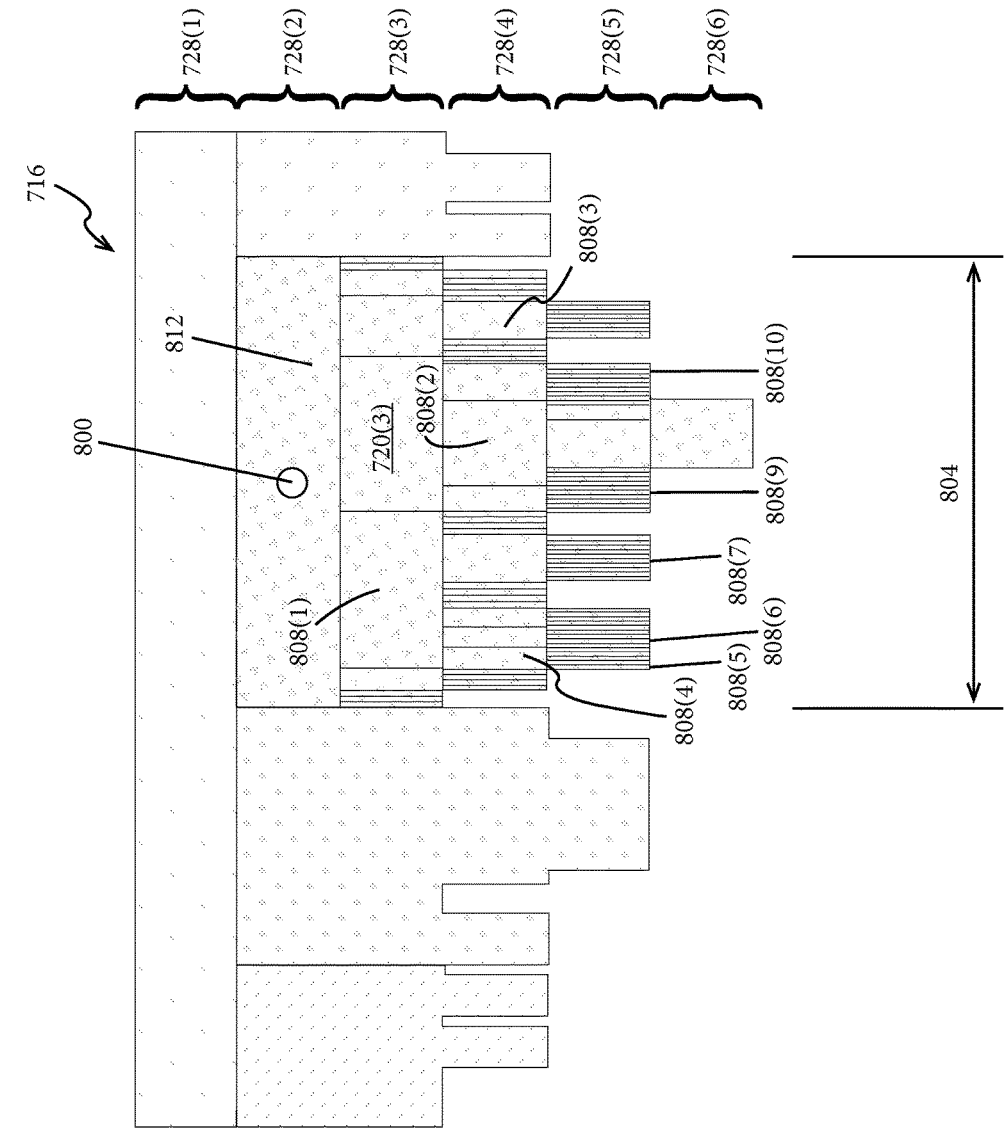
FIG. 8 is a simulated screenshot of the icicle diagram of FIG. 7, showing a portion of the diagram de-abstracted in response to a user selecting a member on the second level down in the organization's hierarchy.

An important complement to the abstraction of nodes in an organizational visualization diagram is the de-abstraction of subsets of nodes on demand of the user. FIG. 8 illustrates icicle diagram 716 of FIG. 7 in which a set of nodes in division 720(3) have been de-abstracted in response to a user making a selection within the third division on level 728(2), i.e., the first level below CEO level 728(1). The selection by the user is represented by a circle 800 in FIG. 8, which can be the result of a user hovering a pointer at the location of the circle, hovering a pointer at the circle and clicking a mouse button or other selection device, touching a touchscreen at the location of the circle, or using any other mode of selection, including 3D motion-location sensing, among others. Upon selection, the IOVT system (not shown) performs one or more de-abstraction algorithms, which in this example performs a variety of functions. In the context of the example of FIG. 1, the de-abstraction algorithm(s) may be executed on the corresponding one of user machines 128(1) to 128(N), for example, as a JAVA® applet or script. Of course, in other contexts, the de-abstraction algorithm(s) can be implemented in another manner. Although de-abstraction may be supported by one or more algorithms, for ease, the following description uses "algorithm" in the singular.

First, the de-abstraction algorithm increases the width 804 of division 720(3) in which the user made the selection 804. Increasing the width of division 720(3) provides a magnification of sorts so that de-abstracted nodes can be rendered and viewed more effectively. The amount of the increase in width can be adjusted as desired and may, for example, be adjusted as a function of the number of de-abstracted nodes that need to be displayed on the most populated level that is being de-abstracted. In the present embodiment, the de-abstraction algorithm also de-abstracts the nodes on the selected level 728(2) as well as the nodes on one or more subordinate levels that are also within the same division. In this example, the algorithm has been configured with a preset maximum abstraction depth of three subordinate levels. Consequently, icicle diagram 716 of FIG. 8 shows the nodes on the three levels 728(3) to 728(5) that are subordinate to selected level 728(2). By "de-abstracted" it is meant that individual nodes, such as nodes 808(1) to 808(10) (only some are labeled to avoid crowding) representing all of the employees on the de-abstracted level(s) are individually rendered. In the example shown, there is one employee 812 on level 728(2), and ten employees (unlabeled) on level 728(3) report to employee 812, who might be considered a division manager or vice president in the exemplary scenario. De-abstraction allows a user to maneuver around within organizational diagram 716 de-abstracting and re-abstracting portions of the diagram as desired.

Figure 9:
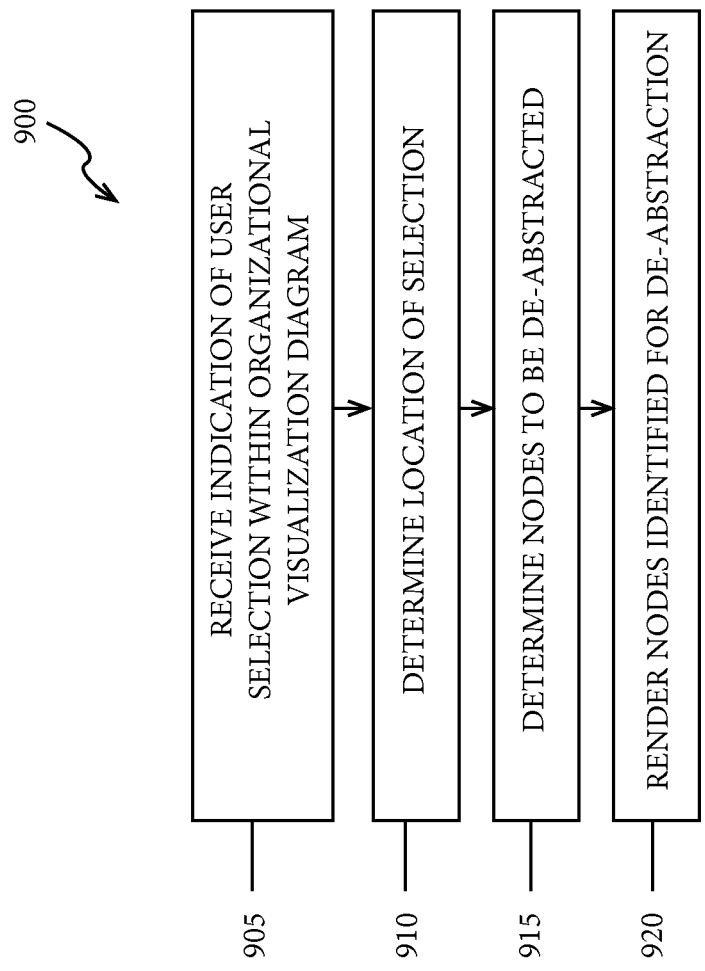
FIG. 9 is a flow diagram illustrating a method of de-abstracting a portion of an abstracted organizational diagram.

FIG. 9 illustrates a de-abstraction method 900 that an IOVT system of the present disclosure, such as IOVT system 100 of FIG. 1, can implement. At step 905, the IOVT system receives an indication of a user making a selection within an organizational visualization diagram. At step 910, the IOVT system determines the location of the selection, such as the lateral segment and level. Then, at step 915, based on the location of the selection, the IOVT system determines which nodes are to be de-abstracted and individually rendered. As alluded to above, this determination can be based on a number of factors, including, but not limited to, the level on which the selection was made, the lateral segment in which the selection was made, a maximum abstraction depth, and the number of subordinate levels beneath the level of the selection. At step 920, the IOVT system renders the nodes identified for de-abstraction at step 915. As also alluded to above, the rendering at step 920 may include increasing the width, or more generally size, of the region in which the de-abstracted nodes will be rendered and rendering the individual nodes so that their borders are visible to a user. In addition, it is noted that if the level on which the selection is made has multiple nodes that need to be de-abstracted, the node that is at the selection is relatively greatly expanded laterally so that all of that node's reports, if any, have a good chance of being reasonably rendered. This is illustrated, for example, in FIGS. 10A to 13, described below. It is noted that if there are so many de-abstracted nodes to be rendered on a particular level that the rendering is not practicable, the rendering may include visual merging of some or all of those nodes to make the diagram more visually appealing.

Figure 10A:
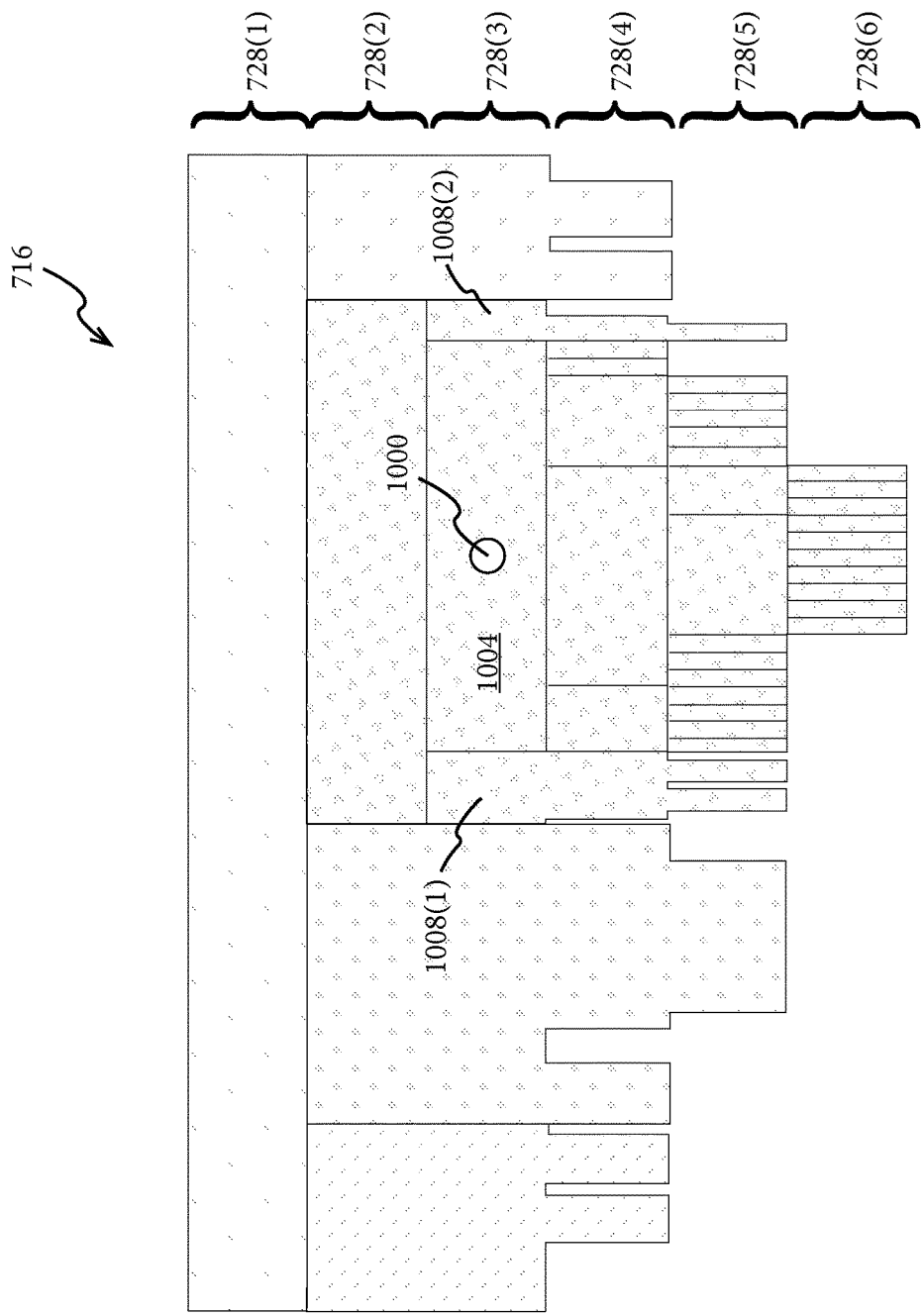
FIG. 10A is a simulated screenshot of the icicle diagram of FIG. 7, showing a portion of the diagram de-abstracted in response to a user selecting a member on the third level down in the organization's hierarchy.

FIGS. 10A and 11-13 illustrate variations of diagram 716 of FIGS. 7 and 8 in which a user has made selections on, respectively, levels 728(3) to 728(6). In FIGS. 10A and 11-13, the user's selections are indicated by corresponding respective circles 1000, 1100, 1200, and 1300. As can be seen in FIG. 10A, the particular user selection 1000 on level 728(3) relatively greatly expands the node 1004 that is "under" the selection for the purpose described above relative to steps 905 to 920 of method 900 of FIG. 9. Before user selection 1000, all of the individual un-abstracted nodes on the selected level, here level 728(3) are abstracted into a single node. Consequently, when the IOVT system determines which non-abstracted node is "under" selection 1000, it can first determine the lateral position of the selection within the abstracted node. Then, the IOVT system, knowing how many un-abstracted nodes are represented by the abstracted node and their relative positions assuming equal width, can relate the on-screen position of selection 1000 to the proper node. For example, if user selection 1000 is in the middle of an abstracted node, and the abstracted node represents five un-abstracted nodes (e.g., employees), the IOVT system would select the middle one of the five un-abstracted nodes for width expansion. FIG. 10A also illustrates that other non-selected, nodes on the same level as selected node 1004, such as the unselected nodes within regions 1008(1) and 1008(2) can remain abstracted. The same is true for children nodes of the non-selected nodes, as is also indicated by regions 1008(1) and 1008(2).

Figure 10B:
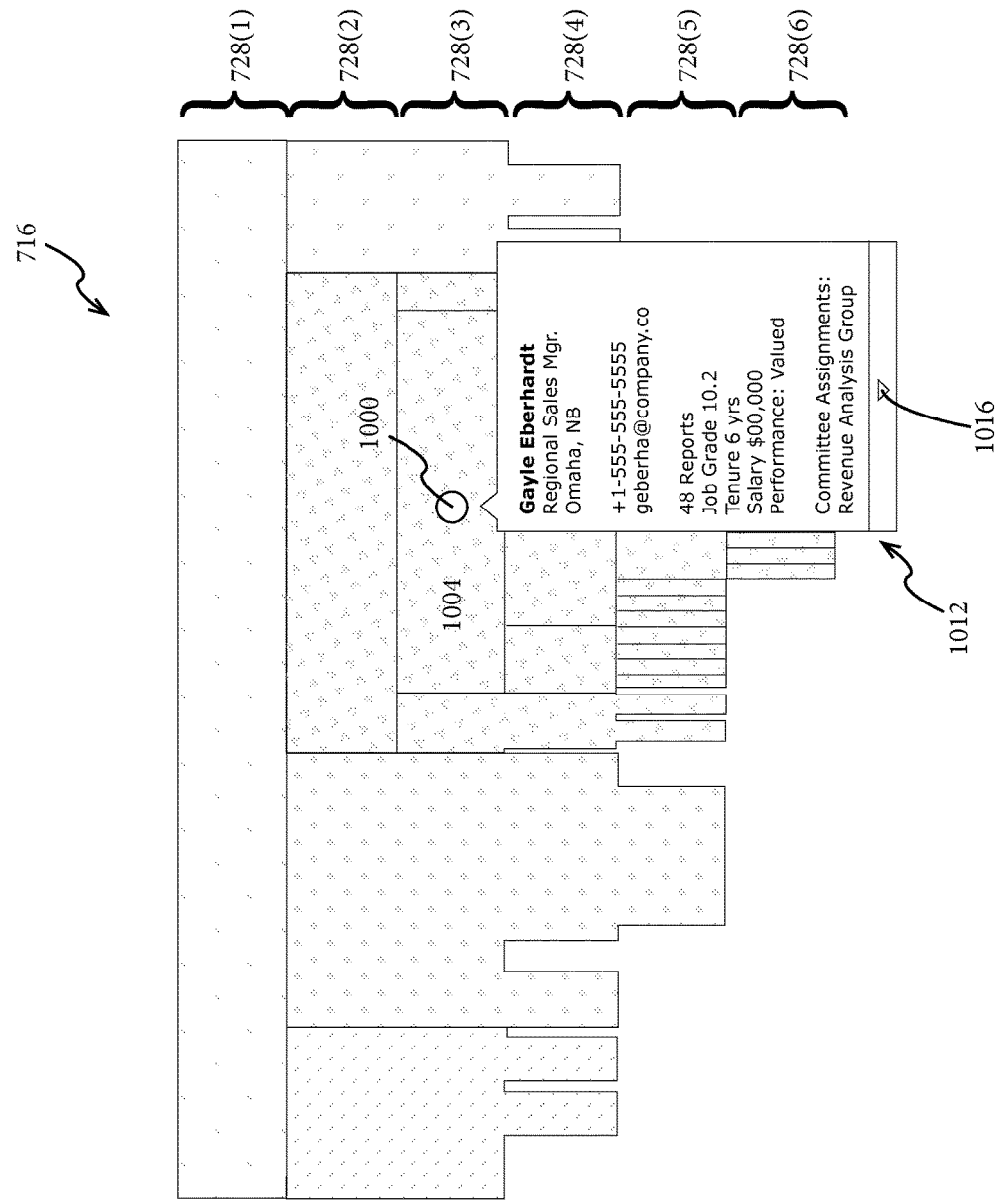
FIG. 10B is a simulated screenshot of the icicle diagram of FIG. 10A, illustrating a display of attributes for the selected member.

FIG. 10B illustrates that the IOVT system may be configured to display a popup window 1012 or other feature containing one or more attributes of the selected un-abstracted node, here node 1004 corresponding to selection 1000. In this example, attributes displayed in popup window 1012 include name, job title, job location, phone number, email address, number of reports, job grade, tenure, salary, performance indicator, and committee assignments. As shown, popup window 1012 may include a scroll control 1016 or other feature that allows a user to display additional information that does not fit into the confines of the window. Such a popup window 1012 may display upon selection or upon another user actuation or command, such as a "right-click" of a mouse button, among many others.

Figure 11:
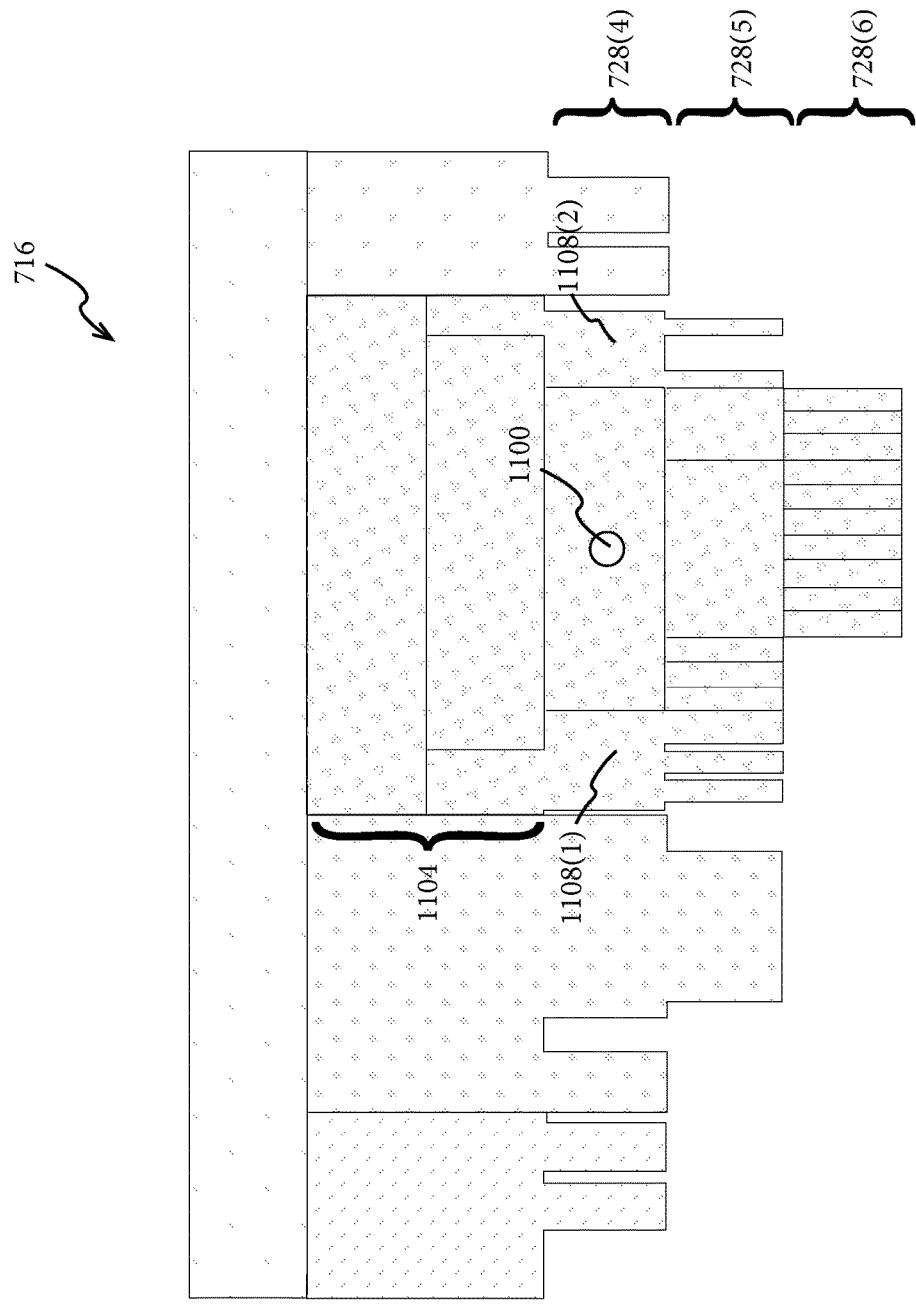
FIG. 11 is a simulated screenshot of the icicle diagram of FIG. 7, showing a portion of the diagram de-abstracted in response to a user selecting a member on the fourth level down in the organization's hierarchy.
Figure 12:
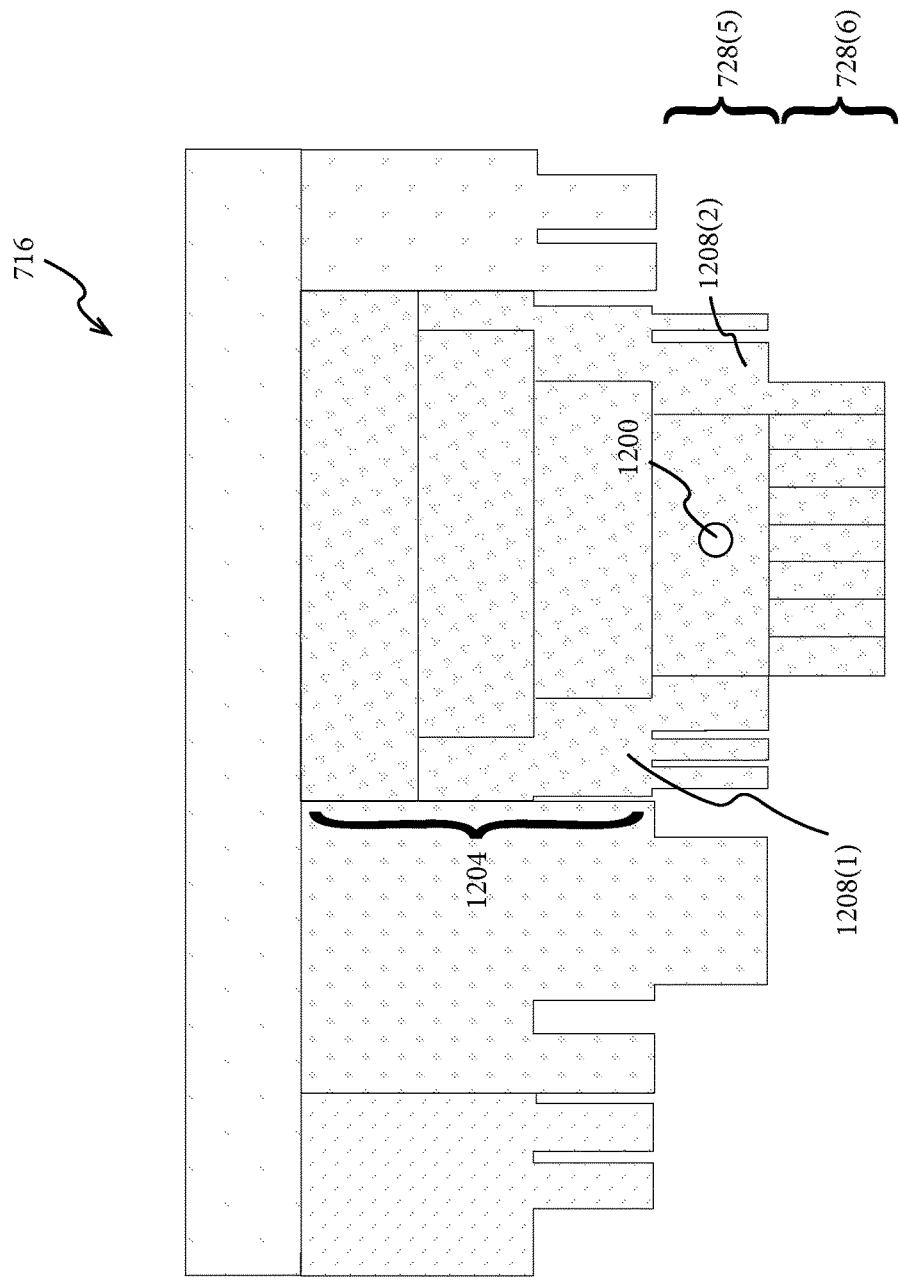
FIG. 12 is a simulated screenshot of the icicle diagram of FIG. 7, showing a portion of the diagram de-abstracted in response to a user selecting a member on the fifth level down in the organization's hierarchy.
Figure 13:
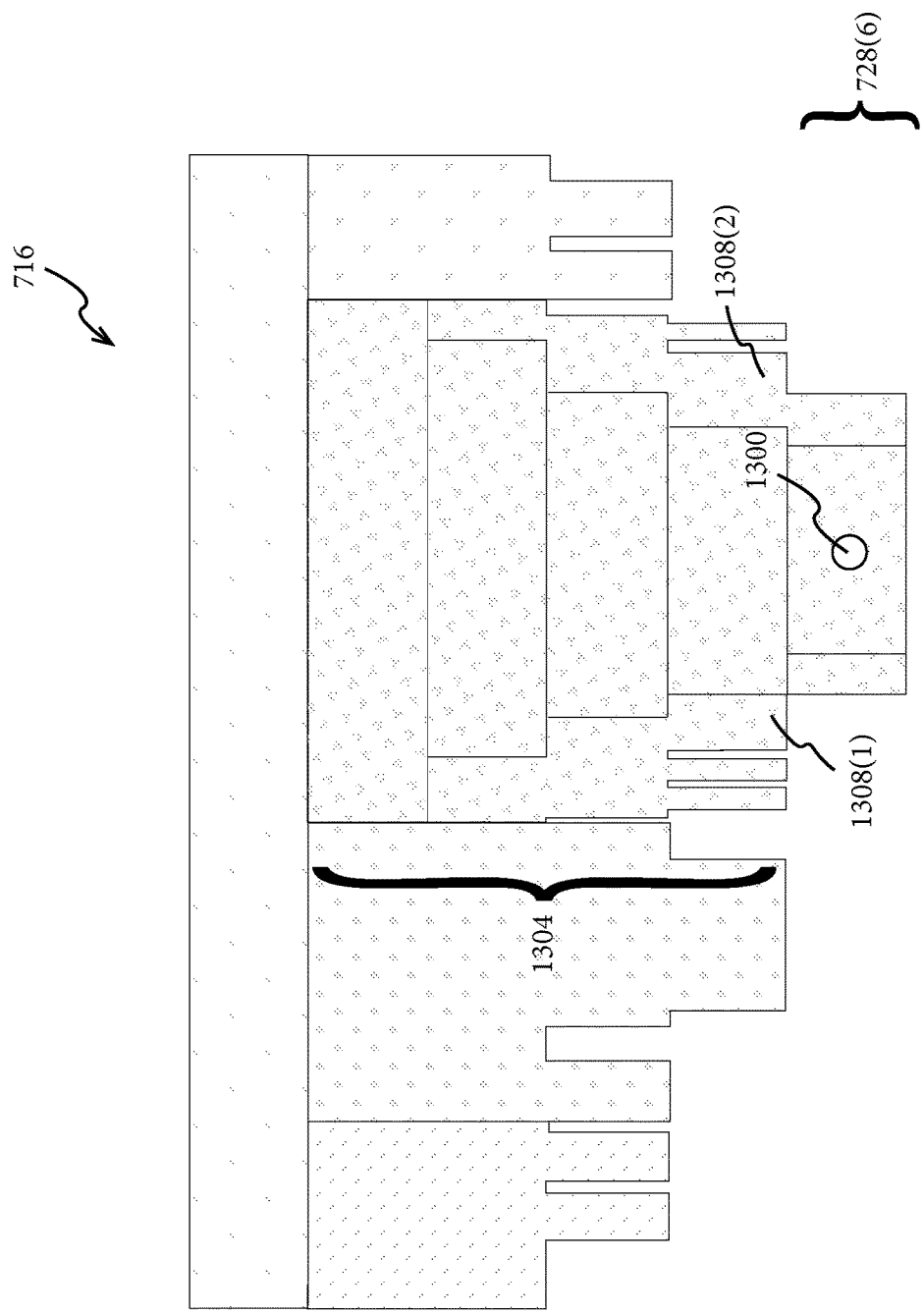
FIG. 13 is a simulated screenshot of the icicle diagram of FIG. 7, showing a portion of the diagram de-abstracted in response to a user selecting a member on the sixth level down in the organization's hierarchy.

FIGS. 11-13 particularly highlight, respectively, how selections 1100, 1200, and 1300 made progressively down a hierarchy result in the display of the direct chains of report 1104, 1204, and 1304 from the selections upward are un-abstracted, but the nodes (employees) on the same levels but outside the direct reporting chains of report remain abstracted. The remaining abstracted regions are shown, respectively, at unitary regions 1108(1) and 1108(2), 1208(1) and 1208(2), and 1308(1) and 1308(2) in FIGS. 11-13. These figures also show that at unitary regions 1108(1) and 1108 (2), 1208(1) and 1208(2), and 1308(1) and 1308(2) nodes on subordinate levels outside of direct reporting chains 1104, 1204, and 1304 can also remain abstracted.

Figure 14:
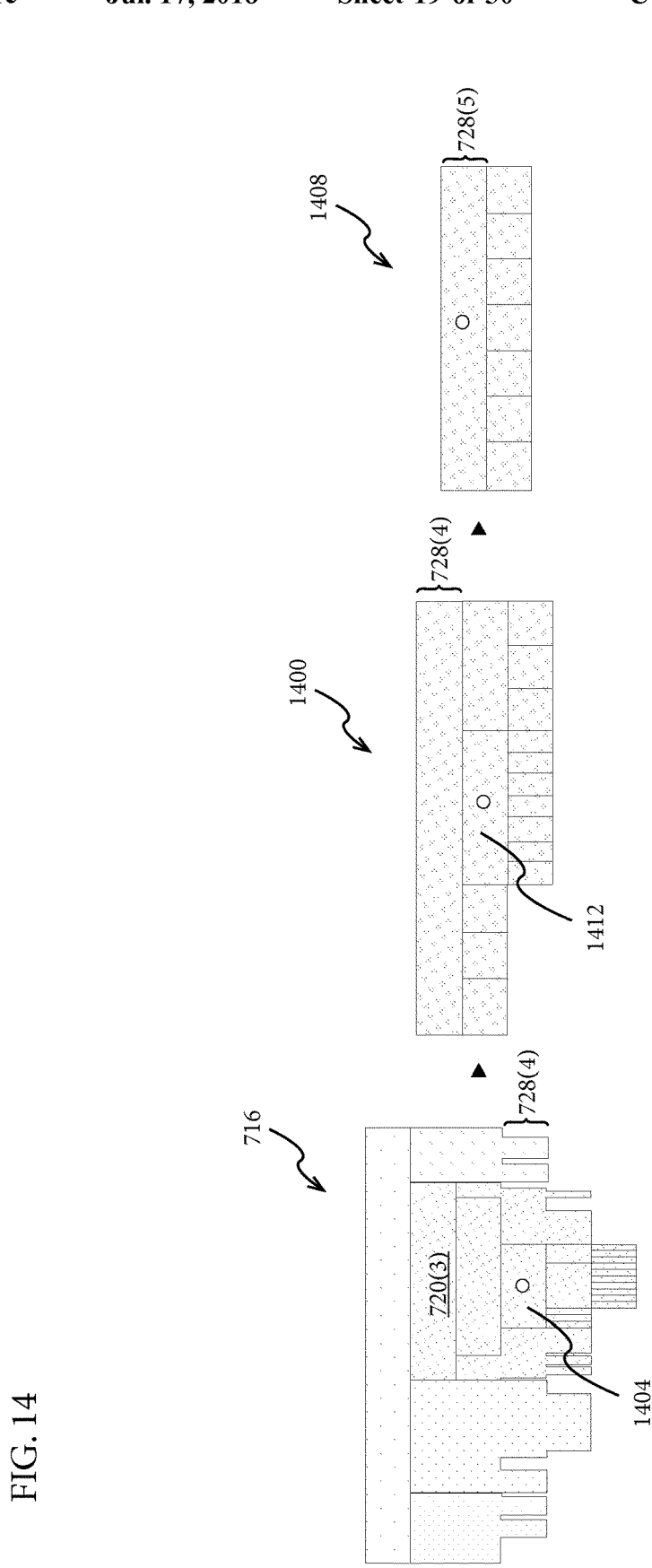
FIG. 14 is a diagram illustrating a progression of extraction of sub-portions of the organizational icicle diagram of FIG. 7.

FIG. 14 illustrates another tool that can be implemented in an IOVT system of the present disclosure, such as IOVT system 100 of FIG. 1. FIG. 14 shows diagram 716 of FIG. 7 in the same partially de-abstracted state illustrated in FIG. 11 that results from user selection 1100 on level 728(4) and within division 720(3). The tool illustrated in FIG. 14 is an extraction tool that allows a user to extract the currently selected un-abstracted node and its children node(s) and have the extracted nodes displayed in a separate diagram. In the example shown in FIG. 14, extracted, or pop-out diagram 1400 results from the user selecting an extract control, such as via a "control-click," "shift-click," "double-click," "double-tap," or any other operation, relative to a desired de-abstracted node, here, de-abstracted node 1404. As seen, pop-out diagram 1400 can be displayed at any suitable size, such as a size larger than the region of original diagram 716 containing those de-abstracted nodes. A benefit to displaying a pop-out diagram, such as diagram 1400, is that the reduced node set can be displayed in a larger screen area, allowing the user to see and/or maneuver around the nodes of the extracted diagram more easily. Pop-out diagram 1400 can be displayed on the same screen as original diagram 716, or it can be displayed on a separate screen, in a separate window, or in the same visual plane, among other possibilities. One or more further extractions from pop-out diagram 1400 can be permitted if desired. For example, FIG. 14 illustrates a second pop-out diagram 1408 that is extracted from extracted diagram 1400. In this example, second pop-out diagram 1408 results from the user implementing the extraction tool relative to de-abstracted node 1412 of pop-out diagram 1400. Similar to pop-out diagram 1400, second pop-out diagram 1408 can be displayed on the same screen as pop-out diagram 1400, or it can be displayed on a separate screen or in a separate window, among other possibilities. Extraction of pop-out diagrams can be implemented in any of the abstraction visualization diagrams described herein, including attribute visualization diagrams.

Figure 15A:
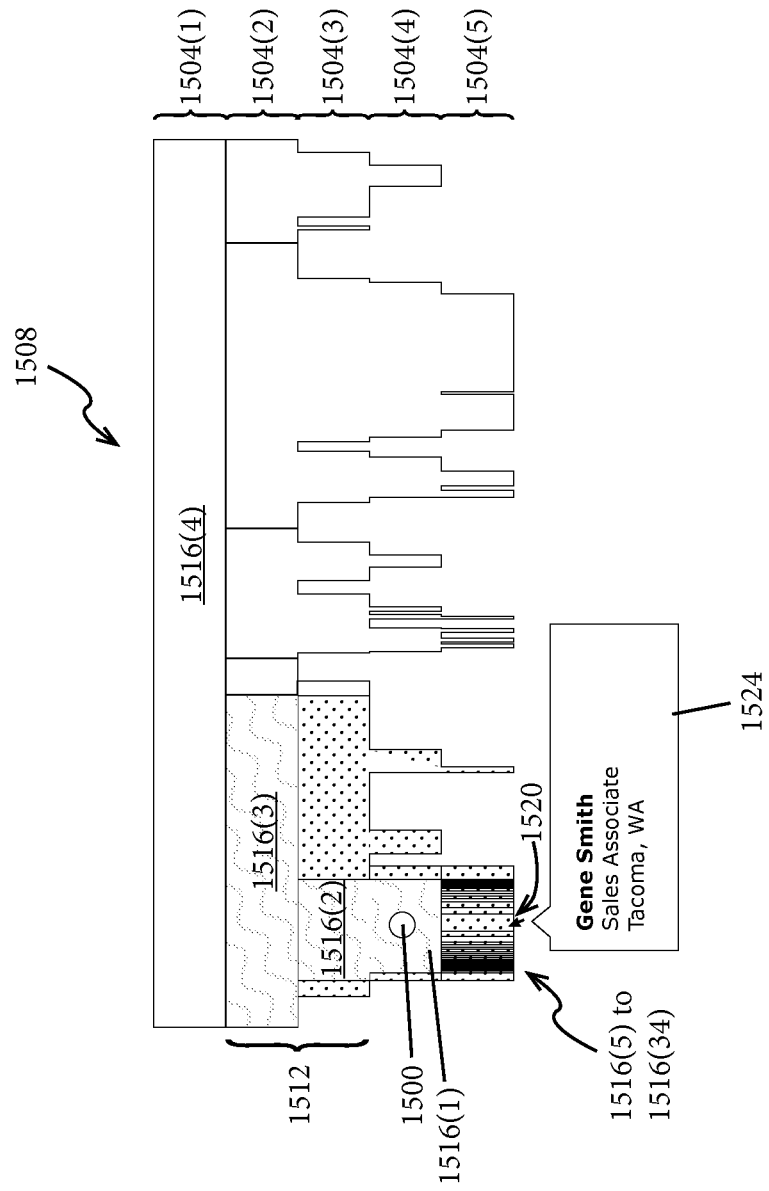
FIG. 15A is a simulated screenshot of an icicle diagram, showing the diagram partially de-abstracted and with a fisheye magnification tool being applied to the de-abstracted portion of the diagram on the fifth level in the hierarchy.
Figure 15B:
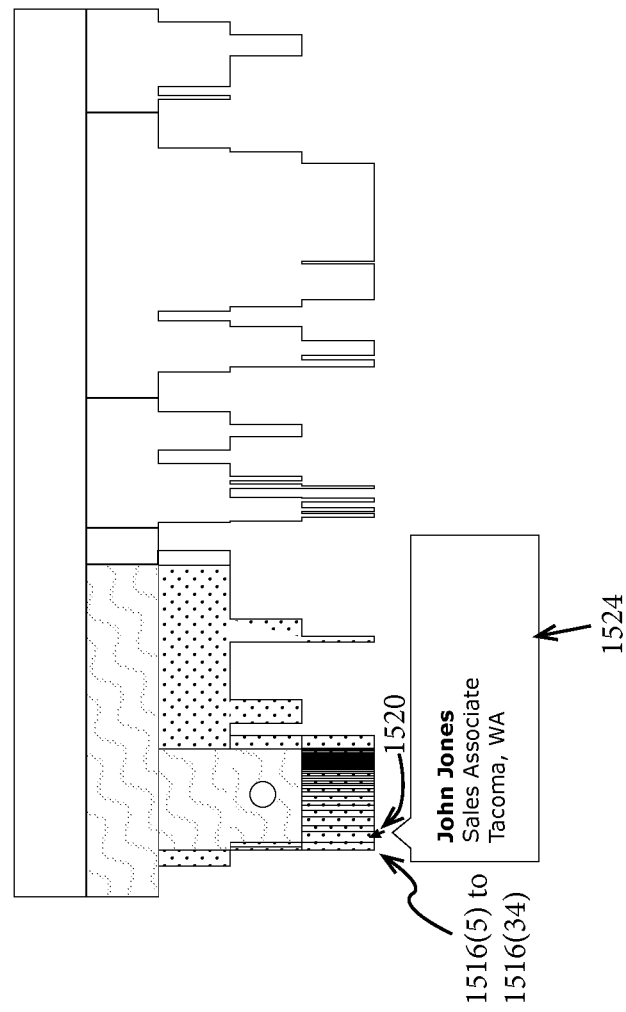
FIG. 15B is a simulated screenshot of the icicle diagram of FIG. 15A, showing the diagram partially de-abstracted and with a fisheye magnification tool being applied to the de-abstracted portion of the diagram on the fifth level in the hierarchy but in a different location than illustrated in FIG. 15A.

FIGS. 15A and 15B illustrate a "fisheye" tool, which is a magnification tool of sorts. As seen in each of FIGS. 15A and 15B, a user has made a de-abstraction selection 1500 on the fourth level 1504(4) within an otherwise abstracted icicle diagram 1508 of a particular organization. De-abstraction selection 1500 results in a corresponding reporting chain 1512 being de-abstracted, with selected node 1516(1) and its superior nodes 1516(2) and 1516(3) on the second and third reporting levels 1504(2) and 1504(4) being de-abstracted. It is noted that there is only a single node 1516(4) on the first level 1504(1). Also de-abstracted are nodes 1516(5) to 1516(34) that are immediately subordinate to selected node 1516(1). As can be readily appreciated, with 30 nodes 1516(5) to 1516(34) being rendered in a relatively small screen space, the widths of each node can be very small, making it difficult for a user to select any particular one. To solve this, when the user turns the fisheye feature on, ones of nodes 1516(5) to 1516(34) at and close to the cursor 1520 are magnified in width so as to make those nodes larger, allowing a user to more easily make selections. In conjunction with the width-expanding aspect, the fisheye feature may also include a node-labeling feature that displays a popup window 1524 in conjunction with cursor 1520 that displays one or more attributes of the one of nodes 1516(5) to 1516(34) over which the cursor is positioned. As can be seen by comparing FIGS. 15A and 15B, movement of cursor 1520 dynamically changes the ones of nodes 1516(5) to 1516(34) that are enlarged as well as dynamically changes the content of popup window 1524 according to the most proximate one of nodes 1516(5) to 1516(34). It is noted that those skilled in the art will readily understand how to implement such a fisheye feature using known graphical rendering techniques.

Figure 16A:
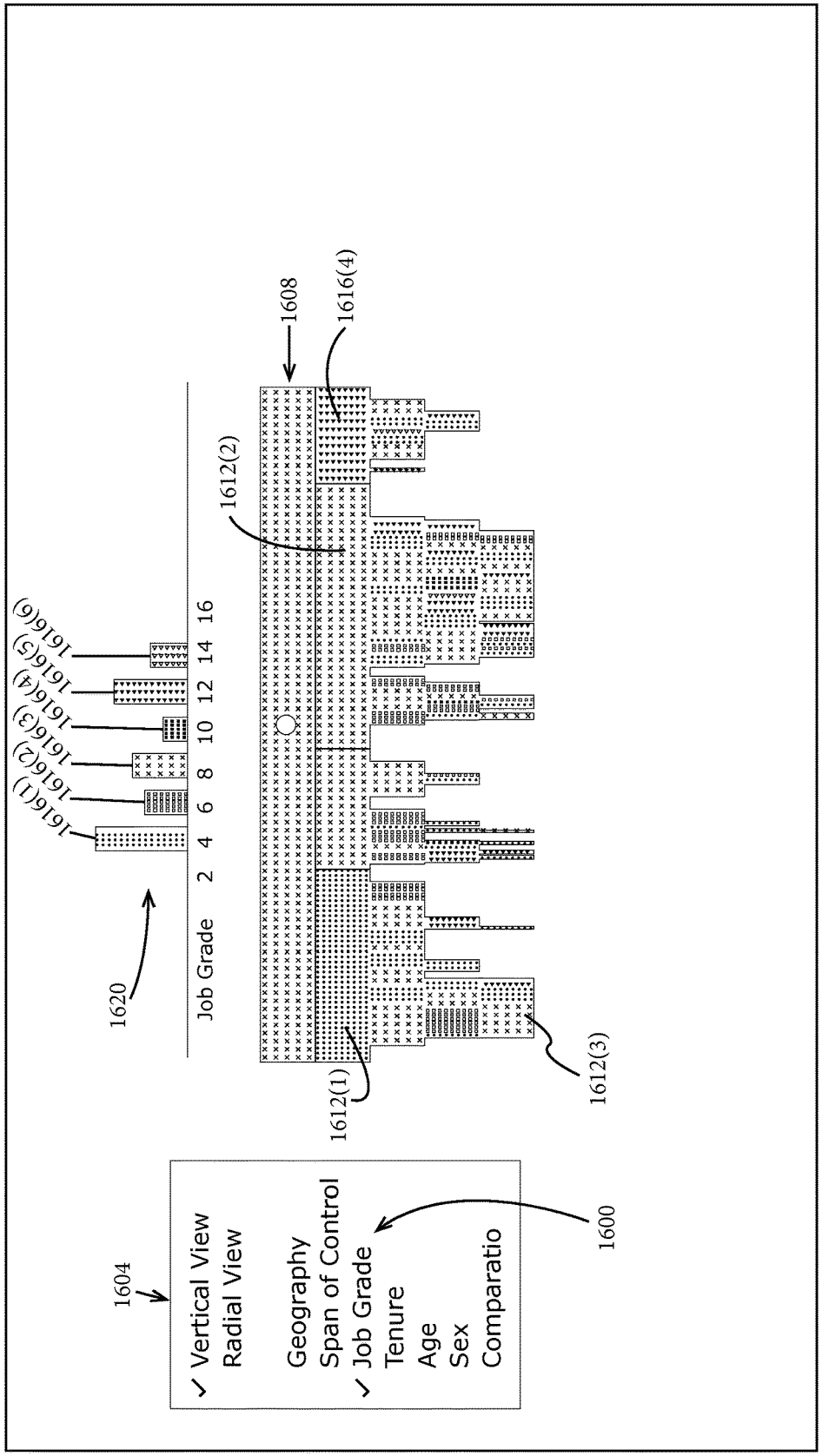
FIG. 16A is a simulated screenshot of an organizational icicle diagram visually cued for job grade.

FIG. 16A illustrates an attribute-visualization tool that allows a user to visualize a particular attribute. In the example of FIG. 16A, the attribute being visualized is job grade, as indicated, for example, by Job Grade selection 1600 being selected in menu 1604. When the user selects Job Grade selection 1600, the IOVT system sorts through the job grade data of the full data set and groups members (nodes) together having the same or similar job grades. The IOVT system then uses these groupings to construct an organizational visualization diagram, here an icicle diagram 1608, that has the same overall visual character as a non-attribute abstraction diagram, but has un-abstracted nodes grouped by common attributes and has such grouped nodes visually merged into composite regions that contain visual cues as to the attributes. Examples of the grouped nodes are grouped nodes 1612(1) to 1612(4); only a relatively small number are labeled to avoid cluttering the figure. In the example shown in FIG. 16A, the visual cues include six differing colors, which are represented in FIG. 16A by six differing stippling types 1616(1) to 1616(6). FIG. 16A also includes a key, here in the form of a histogram 1620, that links differing stippling types 1616(1) to 1616(6) to the differing job grades. Visual cues other than color, such as differing types of hatching, differing types of stippling, displaying values, etc., can be used in other embodiments.

Depending on the particular attribute at issue and the level of abstraction applied to the attribute, in some implementations each visually merged composite region can be colored based on averaging the attribute values of the de-abstracted nodes combined to form that composite region, with each discrete value of each de-abstracted node assigned a corresponding color value. For example, if the attribute is age, ages in the range of 40 years to 50 years may range from light blue to dark blue, and nodes having age values in that range can be grouped together into one or more visually merged composite regions and each of those regions can be colored a shade of blue corresponding to the average age of the nodes in those regions. For example, if the average age in a particular visually merged composite region is 45, that region may be colored a medium blue.

FIG. 16B illustrates another tool that can be used with numerical scale type attributes, such as job grade, age, tenure, and salary, among others. This tool is a selectable scale 1624 that allows a user to select a value or range of values to display in abstraction diagram 1608 and in this example, histogram 1620. In this example, selectable scale 1624 has a selected region 1628 corresponding to job grade 14. Selected region 1628 can be selected using any suitable techniques, such as clicking on selectable scale 1624 and/or clicking-and-dragging upper and lower bounds 1632 to change a value or range. With job grade 14 selected in selectable scale, all regions corresponding to job grade 14 are visually cued with the cue corresponding to job grade 14, here a particular color represented by stippling type 1616(6). Here, only regions 1636(1) and 1636(2) of abstraction diagram 1608 are colored, and regions of the abstraction diagram corresponding all other job grades are uncolored. In this example, with job grade 14 selected in selectable scale 1624, only histogram region 1640 corresponding job grade 14 is colored. When attribute ranges are at issue, a number of color gradation or intensity schemes can be used. As one example, a sub-range of an overall range can be colored according to the portion of the gradation of the overall range. As another example, the gradation for the sub-range can be re-calculated based on only the subset of nodes within the sub-range to create a gradation that is different from the overall-range gradation.

Figure 17A:
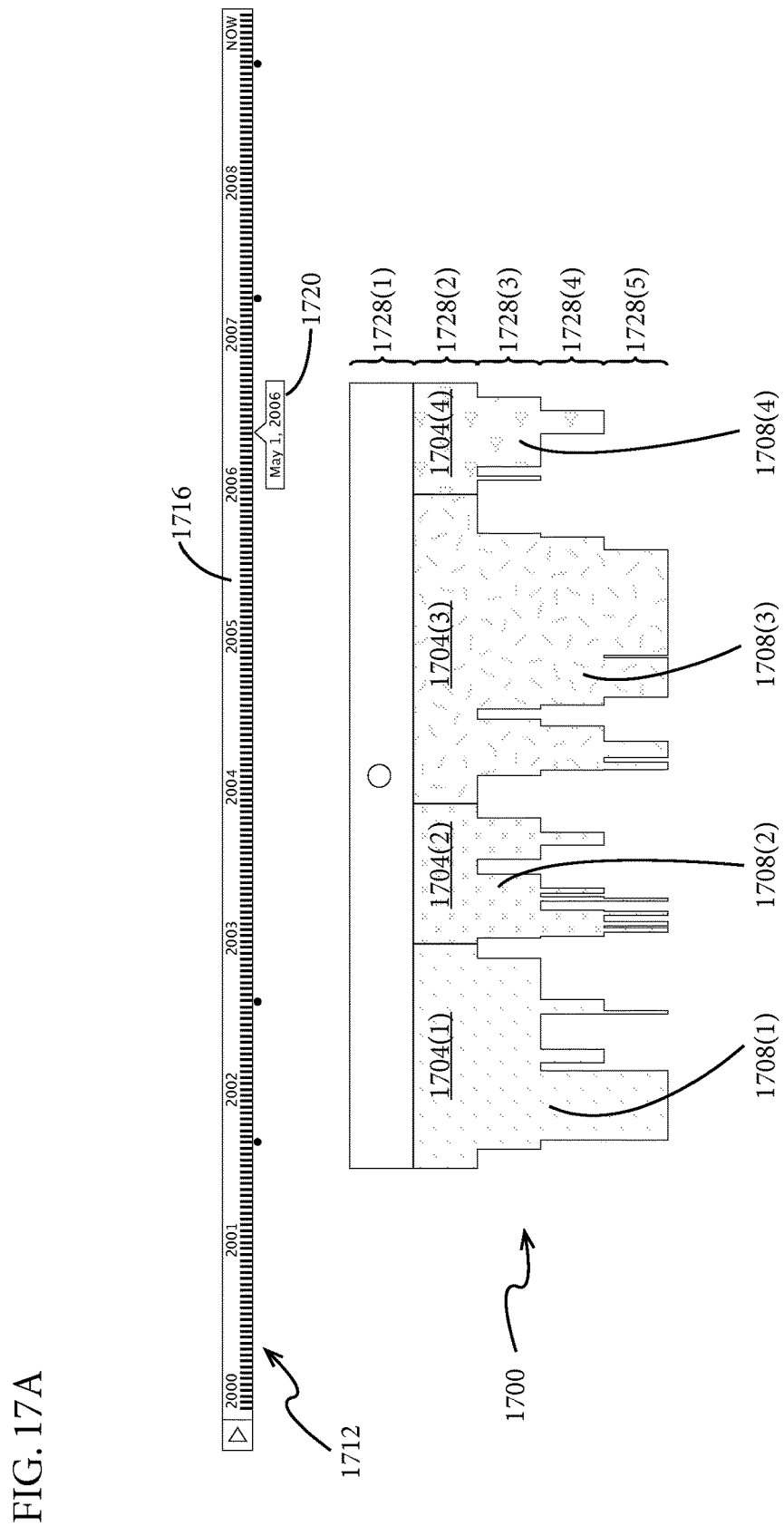
FIG. 17A is a simulated screenshot showing a time-scrubbing control and the state of an organizational icicle diagram at the selected time.
Figure 17B:
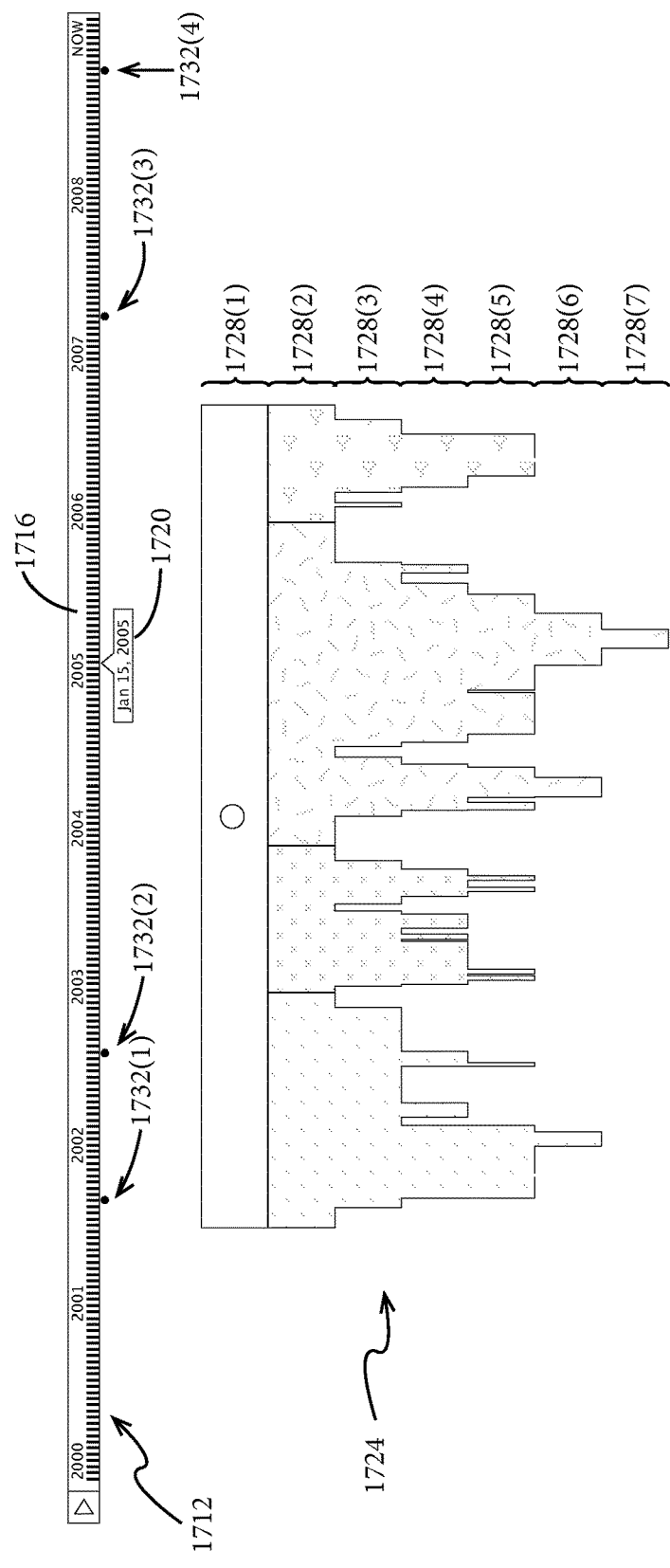
FIG. 17B is a simulated screenshot showing the time-scrubbing control and organizational diagram of FIG. 17A, showing the state of the organizational diagram at selected time that is different from the selected time in FIG. 17A.

FIGS. 17A and 17B illustrate another visualization tool that can be implemented in an IOVT system of the present disclosure, such as IOVT system 100 of FIG. 1. Referring first to FIG. 17A, this figure shows an icicle diagram 1700 that is abstracted and has its abstracted nodes visually merged according to lateral segments. Here, the organization underlying the data results in abstraction icicle diagram 1700 having four lateral segments 1704(1) to 1704(4), such as divisions of a corporation. In accordance with the forgoing, icicle diagram 1700 could represent an organization having hundreds, thousands, tens of thousands, hundreds of thousands, or more, and still have the same visual character as shown in its abstracted and visually merged state. The four different stippling types 1708(1) to 1708(4) represent differing colors in accordance with forgoing disclosure for allowing a viewer to readily visually distinguish the differing lateral segments 1704(1) to 1704(4).

FIG. 17A also shows a time-scrubbing tool 1712 that spans a time-period that includes a period of time in which the underlying organization was/is in existence in one form or another. In this example, time-scrubbing tool 1712 includes a time bar 1716 that indicates a range of times over which a user can time scrub icicle diagram 1700. Time bar 1716 can be configured in any suitable manner, such as with dates as shown, or some other indication of time, such as a display of the amount of time from the current time at which a user is viewing icicle diagram 1700. The exemplary time-scrubbing tool 1712 shown also includes a slider control 1720 that a user can move along time bar 1716 to change the time from which the user can view a snapshot of the underlying organization via icicle diagram 1700. In this example, a user can move slider control 1720 using any suitable technique, such as clicking and dragging (i.e., scrubbing) with a pointing device or via a touch-and-slide gesture with a finger, stylus, etc., on a touch-screen device. As those skilled in the art will readily appreciate, the underlying organizational data can be organized so that any changes in the organization from one point in time to another can be viewed in icicle diagram 1700 when the user moves slider control 1720 from one time to another time. This can be readily seen by comparing icicle diagram 1700 of FIG. 17A, which visualizes the underlying organizational data on May 1, 2006, with icicle diagram 1724 of FIG. 17B, which visualizes the underlying organizational data at an earlier point in time, namely January 15, 2005. Among other changes, a major change that occurred between Jan. 15, 2005 (FIG. 17B), and May 1, 2006 (FIG. 17A), in the underlying organization is that the organization went from a 7-level organization to a 5-level organization, with levels 1728(6) and 1728(7) being eliminated and levels 1728(1) to 1728(5) remaining Another feature of time-scrubbing tool 1712 in this example is a set of indicators, here indicators 1732(1) to 1732(4), along time bar 1716, each of which indicates a time at which a major event occurred in the organization, such as a reorganization, merger, acquisition, etc. It is noted that while time-scrubbing tool 1712 is shown as having time-bar 1716, those skilled in the art will readily appreciate that other time-scrubbing tools can have other ways of allowing a user to change the date of the underlying data set used to generate the organizational visualization diagram, such as a calendar-type date-selection tool, a simulated rotary knob, etc.

Figure 18:
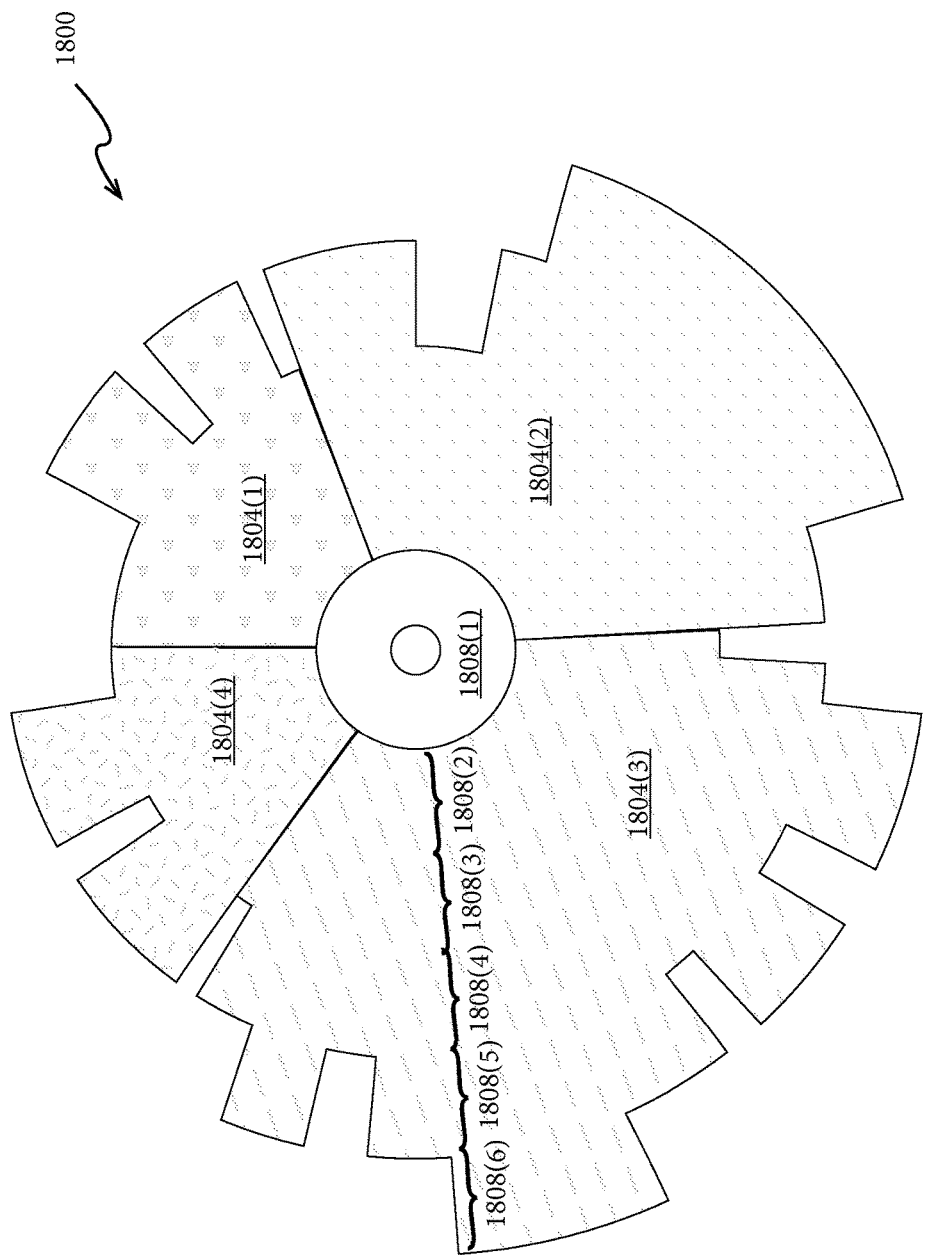
FIG. 18 is a simulates screenshot of a sunburst diagram based on the same organizational data that underlies the icicle diagram of FIG. 7, showing the diagram in a fully abstracted and lateral-segment-only state.
Figure 19:
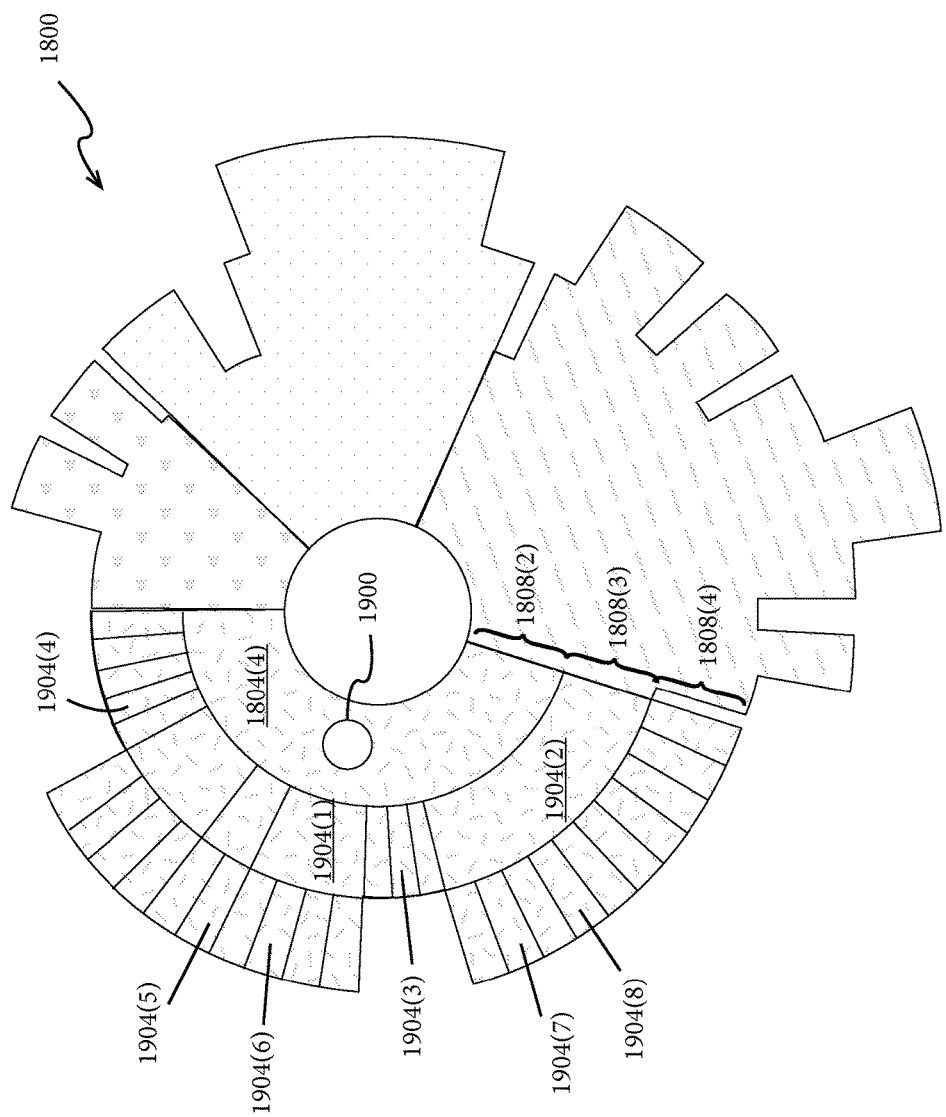
FIG. 19 is a simulated screenshot of the sunburst diagram of FIG. 18, showing a portion of the diagram de-abstracted in response to a user selecting a member on the second level down in the organization's hierarchy.

While FIGS. 7 to 17B utilize icicle, or vertical, diagrams as the organizational visualization diagrams, FIGS. 18 and 19 illustrate the sunburst, or radial, diagrams as the organizational visualization diagrams. Referring first to FIG. 18, this figure shows an abstraction sunburst diagram 1800 that corresponds to abstraction icicle diagram 716 of FIG. 7. As can be seen by comparing sunburst diagram 1800 of FIG. 18 to icicle diagram 716 of FIG. 7, lateral segments 1804(1) to 1804(4) of the sunburst diagram of FIG. 18 correspond, respectively, to lateral segments 720(1) to 720(4) of the icicle diagram of FIG. 7, and levels 1808(1) to 1808(6) of the sunburst diagram of FIG. 18 correspond, respectively, to levels 728(1) to 728(6) of the icicle diagram of FIG. 7. All other aspects and features of sunburst diagram 1800 of FIG. 18, such as node abstraction and visual merging, can be the same as those aspects and features of icicle diagram 716 of FIG. 7. FIG. 19 shows abstraction sunburst diagram 1800 with lateral segment 1804(4) de-abstracted in response to a user making a selection 1900 on second level 1808(2). The manner in which de-abstraction is performed and the results achieved are the same as described above relative to the icicle diagrams. In this example, all of the de-abstracted nodes, such as nodes 1904(1) to 1904(8) (only some are labeled to avoid clutter), are displayed on levels 1808(2) to 1808(4).

Figure 20:
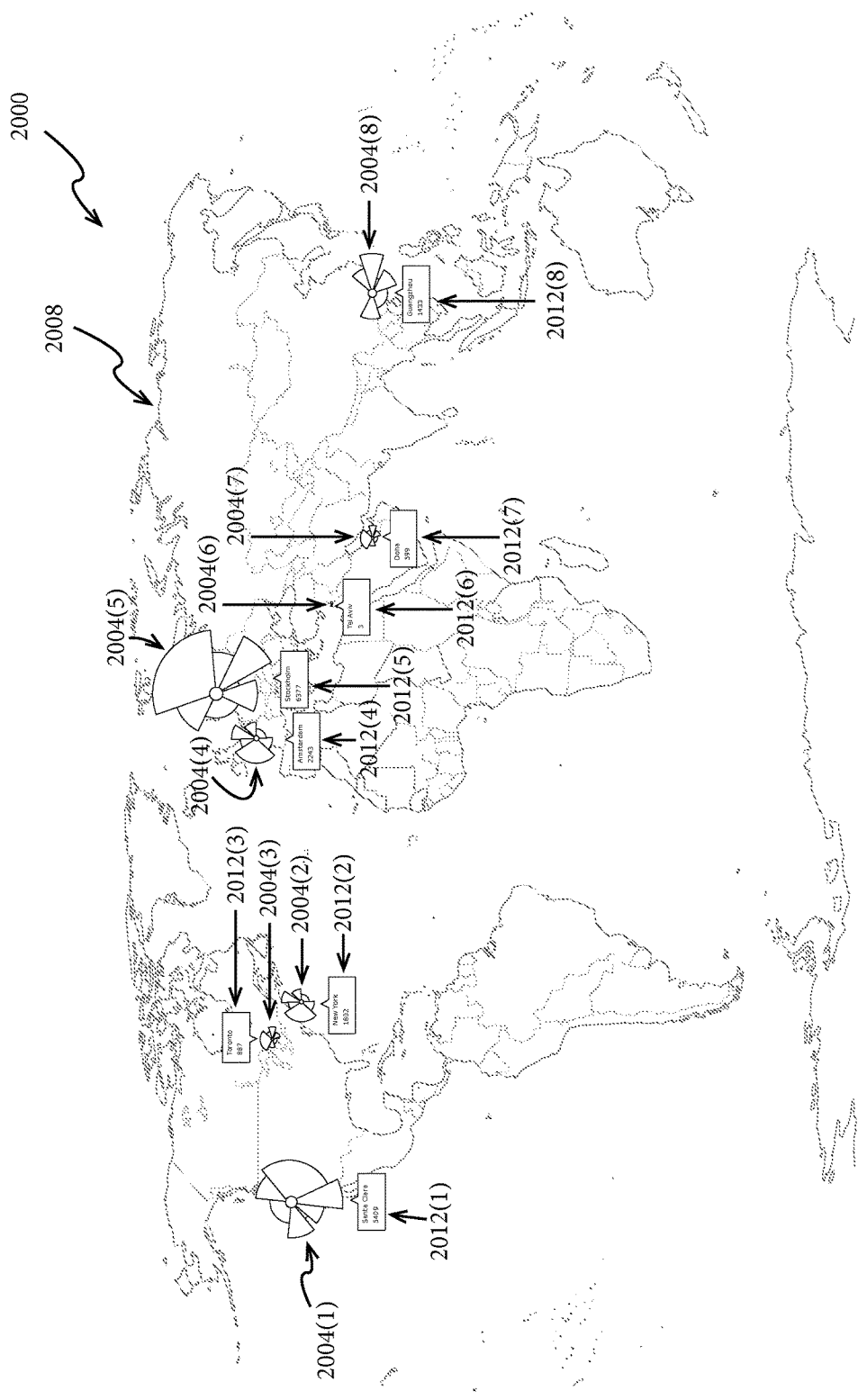
FIG. 20 is a simulate screenshot illustrating a geographically-excerpted view of organizational data of an organization having members at multiple differing geographical locations.

FIG. 20 illustrates yet another visualization tool that can be implemented in an IOVT system of the present disclosure, such as IOVT system 100 of FIG. 1. This tool is a geographical distribution tool 2000 in which one or more organizational visualization diagrams, here eight abstraction sunburst diagrams 2004(1) to 2004(8), are shown overlaid onto a geographical map, here a global map 2008, according to the location(s) of an organization's members' geographical locations. In the example shown in FIG. 20, the organization illustrated is a multinational organization having its members distributed among eight geographical locations around the world, namely, Santa Clara 2012(1), New York 2012(2), Toronto 2012(3), Amsterdam 2012(4), Stockholm 2012(5), Tel Aviv 2012(6), Doha 2012(7), and Guangzhou 2012(8). Each of abstraction sunburst diagrams 2004(1) to 2004(8) represents only the members of the organization at the corresponding location. In addition, each abstraction sunburst diagram 2004(1) to 2004(8) can be de-abstracted according to the principles described above and/or can be subjected to any suitable attribute visualization tool, such as the attribute visualization tools described above. A selection menu the same as or similar to menu 708 of FIG. 7 can be used for this or other purposes.

It is to be noted that the aspects and embodiments described herein may be conveniently implemented using one or more machines (e.g., one or more computing devices/computer systems that are part of an IOVT system) including hardware and special programming according to the teachings of the present specification, as will be apparent to those of ordinary skill in the computer arts. Appropriate software coding can readily be prepared by skilled programmers based on the teachings of the present disclosure, as will be apparent to those of ordinary skill in the software arts.

Such software may be a computer program product that employs a machine-readable hardware storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. Such a data signal or carrier wave would not be considered a machine-readable hardware storage medium. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof.

Figure 21:
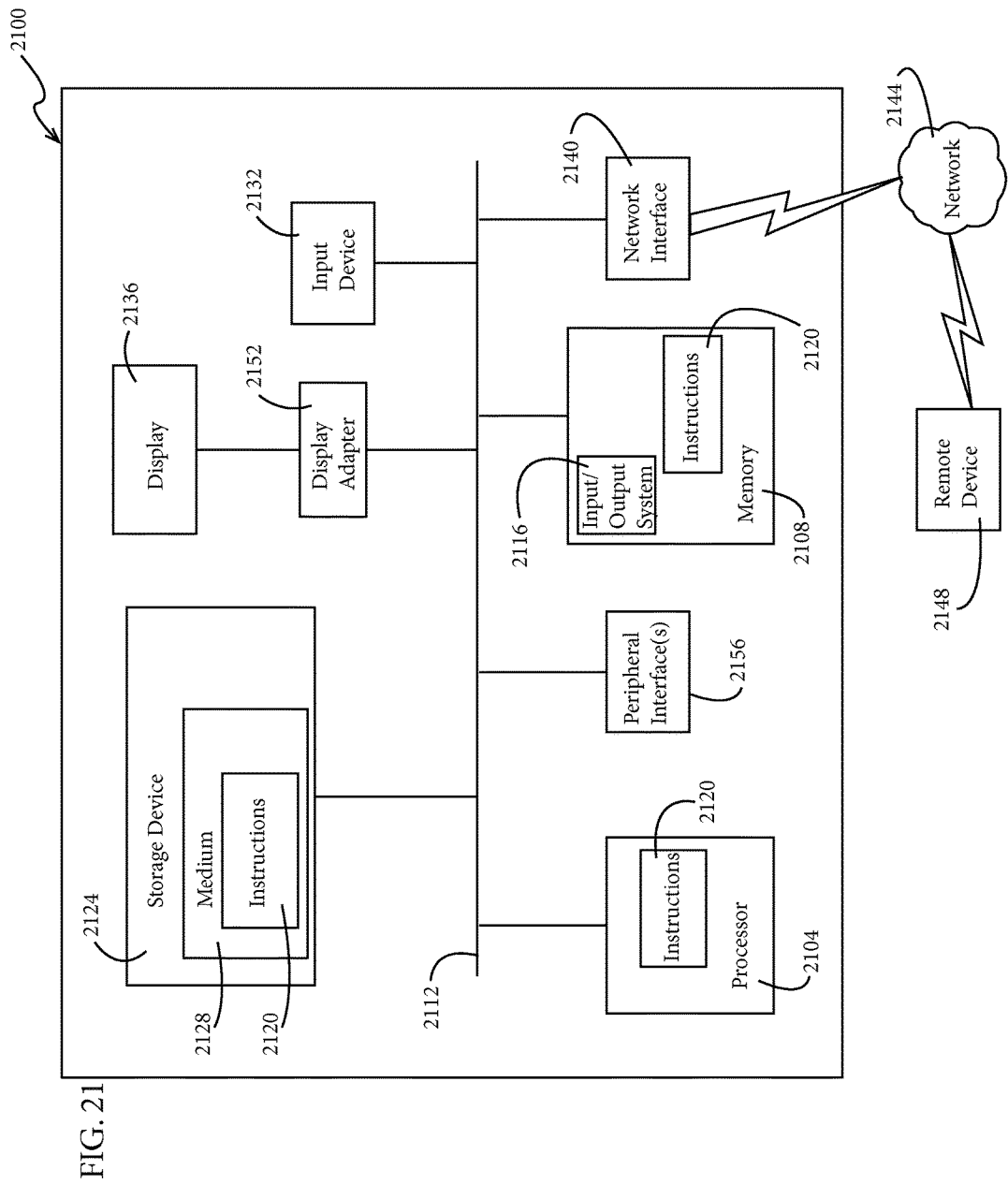
FIG. 21 is a high-level diagram of a computing system that can be used to contain and execute software instructions for implementing one or more of the functionalities described herein.

FIG. 21 shows a diagrammatic representation of one exemplary embodiment of a computing system 2100, within which a set of instructions for causing one or more processors 2104 to perform any one or more of the functionalities, aspects, and/or methodologies of the present disclosure. It is also contemplated that multiple computing systems may be utilized to implement a specially configured set of instructions for performing any one or more of the functionalities, aspects, and/or methodologies of the present disclosure in a distributed computing matter.

Computing system 2100 can also include a memory 2108 that communicates with the one or more processors 2104, and with other components, for example, via a bus 2112. Bus 2112 may include any of several types of bus structures including, but not limited to, a memory bus, a memory controller, a peripheral bus, a local bus, and any combinations thereof, using any of a variety of bus architectures.

Memory 2108 may include various components (e.g., machine-readable hardware storage media) including, but not limited to, a random access memory component (e.g., a static RAM "SRAM", a dynamic RAM "DRAM", etc.), a read only component, and any combinations thereof. In one example, a basic input/output system 2116 (BIOS), including basic routines that help to transfer information between elements within computing system 2100, such as during start-up, may be stored in memory 2108. Memory 2108 may also include (e.g., stored on one or more machine-readable hardware storage media) instructions (e.g., software) 2120 embodying any one or more of the aspects and/or methodologies of the present disclosure. In another example, memory 2108 may further include any number of program modules including, but not limited to, an operating system, one or more application programs, other program modules, program data, and any combinations thereof.

Computing system 2100 may also include a storage device 2124, such as, but not limited to, the machine readable hardware storage medium described above. Storage device 2124 may be connected to bus 2112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2124 (or one or more components thereof) may be removably interfaced with computing system 2100 (e.g., via an external port connector (not shown)). Particularly, storage device 2124 and an associated machine-readable medium 2128 may provide nonvolatile and/or volatile storage of machine-readable instructions, data structures, program modules, and/or other data for computing system 2100. In one example, software instructions 2120 may reside, completely or partially, within machine-readable hardware storage medium 2128. In another example, software instructions 2120 may reside, completely or partially, within processors 2104.

Computing system 2100 may also include an input device 2132. In one example, a user of computing system 2100 may enter commands and/or other information into computing system 2100 via one or more input devices 2132. Examples of an input device 2132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device(s) 2132 may be interfaced to bus 2112 via any of a variety of interfaces (not shown) including, but not limited to, a serial interface, a parallel interface, a game port, a USB interface, a FIREWIRE interface, a direct interface to bus 2112, and any combinations thereof. Input device(s) 2132 may include a touch screen interface that may be a part of or separate from display(s) 2136, discussed further below. Input device(s) 2132 may be utilized as a user selection device for selecting one or more graphical representations in a graphical interface as described above.

A user may also input commands and/or other information to computing system 2100 via storage device 2124 (e.g., a removable disk drive, a flash drive, etc.) and/or network interface device(s) 2140. A network interface device, such as any one of network interface device(s) 2140 may be utilized for connecting computing system 2100 to one or more of a variety of networks, such as network 2144, and one or more remote devices 2148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network, a telephone network, a data network associated with a telephone/voice provider, a direct connection between two computing devices, and any combinations thereof. A network, such as network 2144, may employ a wired and/or a wireless mode of communication. In general, any network topology may be used. Information (e.g., data, software instructions 2120, etc.) may be communicated to and/or from computing system 2100 via network interface device(s) 2140.

Computing system 2100 may further include one or more video display adapter 2152 for communicating a displayable image to one or more display devices, such as display device(s) 2136. Examples of a display device include, but are not limited to, a liquid crystal display (LCD), a cathode ray tube (CRT), a plasma display, a light emitting diode (LED) display, and any combinations thereof. Display adapter(s) 2152 and display device(s) 2136 may be utilized in combination with processor(s) 2104 to provide a graphical representation of a utility resource, a location of a land parcel, and/or a location of an easement to a user. In addition to a display device, computing system 2100 may include one or more other peripheral output devices including, but not limited to, an audio speaker, a printer, and any combinations thereof. Such peripheral output devices may be connected to bus 2112 via a peripheral interface 2156. Examples of a peripheral interface include, but are not limited to, a serial port, a USB connection, a FIREWIRE connection, a parallel connection, and any combinations thereof.

Figure 22:
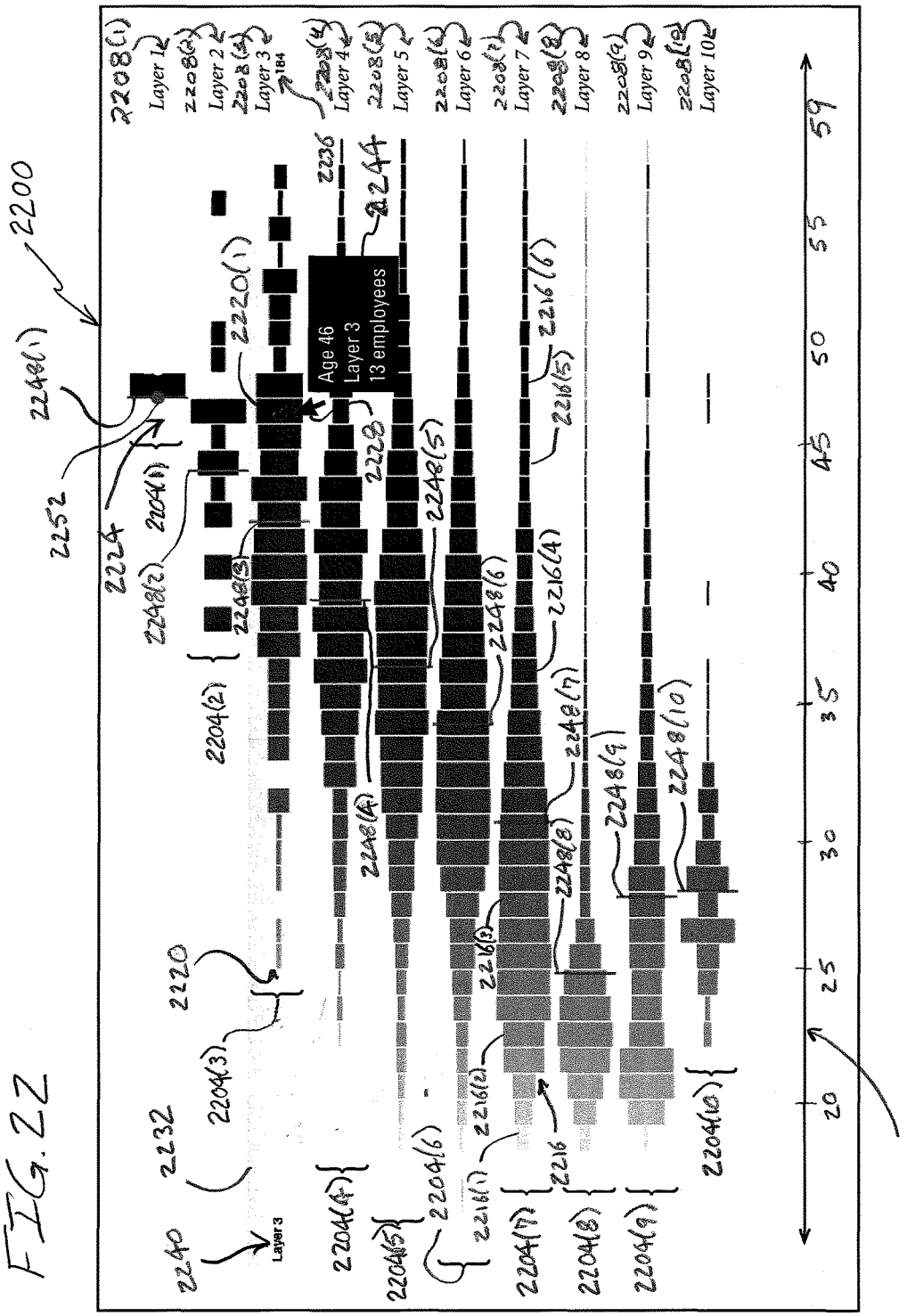
FIG. 22 is a simulated screenshot illustrating a layered histogram generated by an exemplary layered-histogram tool of the present disclosure.

FIG. 22 illustrates a further visualization tool that can be implemented in an IOVT system of the present disclosure, such as IOVT system 100 of FIG. 1. This tool is a layered histogram tool that a user can use to generate a layered histogram 2200 that allows the user to visualize, for example, layer-by-layer distributions of employee attributes across layers of the subject organization. Generally, the layered histogram tool is designed and configured to provide a visualization format that enables analysis of an organization based on a selected set of data metrics as distributed across the organization's layers. In an exemplary embodiment, the format of layered histogram 2200 includes a plurality of stacked histograms 2204 in a number corresponding to the number of layers 2208 within the organization, here histograms 2204(1) to 2204(10) corresponding, respectively, to organization layers 2208(1) to 2208(10). As those skilled in the art will understand, the data metric, or member attribute, that the layered histogram tool can be configured to handle can include, but is not necessarily limited to, employee age (shown in FIG. 22), tenure, job grade, performance, span of control, and compa-ratio, annual compensation, among others.

Whichever member attribute a user selects, the layered histogram tool may display the corresponding data as a plurality of histograms, such as a set of vertically layered histograms, across the organization as illustrated in FIG. 22 by histograms 2204(1) to 2204(10) corresponding, respectively, to layers 2208(1) to 2208(10) of the organization at issue. In such a vertically layered histogram presentation, the layered histogram tool may present one or more scales, such as age scale 2212 shown in FIG. 22, that indicate the range of the values associated with the selected member attribute. In the present example of FIG. 22 having age as the attribute, scale 2212 is configured to display a range of ages from the lowest age in the organization to the highest age in the organization. Other ranges could be used, such as the lowest allowed working age to the highest age ever obtained by a human, among others. Of course, other values will be used for other member attributes. For example, performance may have a numerical scale, such as one to ten, or a descriptive scale, such as poor to outstanding, compa-ratio may have a scale of 0 to 1.00, compensation may have a scale in dollars or other monetary unit, etc. Those skilled in the art will readily appreciate which range of values are suitable for being displayed for any given member attribute.

Each histogram 2204 has a plurality of interval indicators that represents the number of members that fall within that particular interval (In the example shown, each interval represents a single year of age.) For example, histogram 2204(7) for organization layer 7 2208(7) has a plurality of vertical bar type interval indicators 2216, such as indicators 2216(1) to 2216(6) and histogram 2204(3) for layer 3 2208(2) has a plurality of similar indicators 2220, such as indicator 2220(1) (only one labeled for convenience and to avoid clutter), with one corresponding to each year of age that includes at least one member. Where an age interval has no members on a particular level, the corresponding space relative to scale 2212, such as age 46 on layer 1 2208(1), is represented in layered histogram 2200 of this embodiment by a blank space, here blank space 2224 for age 46 on layer 1. In this example, the height of each vertical bar type interval indicator, such as indicators 2216(1) to 2216(6), represents the number of members falling within the corresponding age interval. In the example shown, the interval indicators are located vertically relative to FIG. 22 so that their centers of gravity define a straight line within the corresponding histogram 2204(1) to 2204(10). In other embodiments, the interval indicators can be arranged differently, such as having their bottoms lie on a common straight line. In other embodiments, other shaped indicators can be used.

The layered histogram tool may be configured to include one or more of a number of useful features. For example, by hovering a pointer 2228 over, or otherwise selecting or indicating, one of histograms 2204 may cause the layered histogram tool to highlight that histogram, as shown for layer 3 2208(3) by highlighting 2232. Such hovering may also cause the layered histogram tool to display the total number of members, such as shown at region 2236, and/or display a label for the layer, such as shown at region 2240. In addition or alternatively, hovering pointer 2228 over or otherwise selecting or indicating one of interval indicators 2216 may cause the layered histogram tool to display an information box, such as information box 2244 displayed as the user hovers the pointer over interval indicator 2220(1). In this example, information box 2244 displays information pertinent to interval indicator 2220(1), specifically, that this indicator is for age 46, is located on layer 3 2208(3), and represents 13 employees. The information displayed will typically change depending on the member attribute that layered histogram 2200 represents.

An additional feature can include the layered histogram tool being configured to display one or more statistical indicators that indicate statistical information about each histogram. In the example shown, each histogram 2204(1) to 2204(10) includes a corresponding vertical-bar indicator 2248(1) to 2248(10) representing the average value (age) for that layer. Another additional feature that the layered-histogram tool can provide is a dot, such as dot 2252, that represents a user-selection of a single employee (member), the layer on which that member resides, that member's attribute value in the data range, and where that member falls in relationship to the layer average. In the example shown, dot 2252 is on layer 1, which has a single member. For example, this member could be the leader of the organization.

Vertically and horizontally, a layered histogram, such as layered histogram 2200, totals the entirety of an organization's employee (member) body (e.g., 20,000 employees) and allows a user to quickly visually grasp information about the organization. With the histograms presented layer-by-layer, a user can analyze how certain employee attributes are distributed and concentrated, as well as see specific values upon selection. In the specific example of FIG. 22, a viewer can readily see from layered histogram 2200 how the average age of employees drops the deeper one goes in the organization before increasing slightly in layers 9 and 10. The format of layers and histograms, plus the use of average markers and a top-level histogram can be used in equal fashion when the user changes the attribute to, say, job grade, tenure, or others.

In one aspect of a layered histogram tool, a method of displaying a visualization diagram of an organization of members on an electronic display. The method comprises: electronically receiving hierarchical organizational data concerning the members of the organization, wherein the hierarchical organizational data represents a plurality of unabstracted nodes corresponding respectively to the members of the organization, wherein the hierarchical organizational data includes data on a member metric for each of the members; automatedly consolidating at least some of the unabstracted nodes into abstracted nodes; automatedly assigning weights to the abstracted nodes as a function of how many unabstracted nodes are represented by each of the abstracted nodes; and automatedly rendering the abstracted nodes on the electronic display in a layered histogram as a part of creating the visualization diagram.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of rendering, on an electronic display, a visual abstraction diagram of an entire organizational chart having a first number of nodes, wherein the entire organizational chart represents an organization containing the first number of members, wherein the first number of members corresponds respectively to the first number of nodes on the entire organizational chart that contains a plurality of hierarchical levels, the method comprising:
  receiving organization data representing the entire organizational chart containing the first number of nodes;
  storing the organization data in memory;
  retrieving a node-abstraction algorithm from the memory, wherein the node-extraction algorithm is configured to:
    consolidate sibling nodes of the first number of nodes on various ones of the plurality of hierarchical levels to generate a plurality of consolidated nodes, wherein the total number of the plurality of consolidated nodes and all unconsolidated nodes, if any, is less than the first number of nodes; and
    assign a weight to each parent node in the total number of the plurality of consolidated nodes and all unconsolidated nodes such that the weight on the parent node is equal to the sum of the weights of all child nodes of the parent node;
  retrieving the organization data from the memory;
  executing, using the organization data, the node-abstraction algorithm to create abstraction data representing an abstracted organizational chart containing the total number of the plurality of consolidated nodes and all unconsolidated nodes in a hierarchy, the abstraction data including the weight of each of the total number of the plurality of consolidated nodes and all unconsolidated nodes;
  storing the abstraction data in the memory so that the weights are associated with correspond respective ones of the total number of the plurality of consolidated nodes and all unconsolidated nodes;
  retrieving a visual rendering algorithm from the memory, wherein the visual rendering algorithm is configured to render sizes of the total number of the plurality of consolidated nodes and all unconsolidated nodes of the visual abstraction diagram as a function of the weights;
  retrieving the abstraction data from the memory; and
  executing, using the abstraction data, the visual rendering algorithm to render the visual abstraction diagram in entirety within a graphical user interface (GUI) on the electronic display;
  wherein:
    said executing a visual rendering algorithm includes visually merging ones of the consolidated nodes with one another; and
    wherein the organization has a second number of lateral segments and said visually merging ones of the consolidated nodes with one another includes visually merging together all of the consolidated nodes within each of the plurality of lateral segments so as to create the second number of visually merged regions corresponding respectively to the second number of the lateral segments.

2. A method according to claim 1, wherein said executing a visual rendering algorithm includes executing a visual rendering algorithm that renders the visual abstraction diagram as a sunburst diagram.

3. A method according to claim 1, wherein said executing a visual rendering algorithm includes executing a visual rendering algorithm that renders the visual abstraction diagram as an icicle diagram.

4. A method according to claim 1, further comprising automatedly applying the differing visual cues respectively to the second number of visually merged regions.

5. A method according to claim 4, wherein said applying the differing visual cues includes applying differing colors.

6. A method according to claim 1, further comprising:
  receiving, via the GUI, a first user selection within a rendered abstracted node within the visual abstraction diagram;
  in response to the first user selection, de-abstracting one or more consolidated nodes into corresponding respective ones of the first number of nodes; and
  rendering the corresponding respective ones of the first number of nodes in the visual abstraction diagram.

7. A method according to claim 6, said de-abstracting one or more consolidated nodes includes de-abstracting the one or more consolidated nodes to no greater than a predetermined depth within the plurality of hierarchical levels.

8. A method according to claim 6, wherein the user selection occurs on a selected one of the plurality of hierarchical levels within the organization, said de-abstracting including de-abstracting one of the consolidated nodes on the selected one of the plurality of hierarchical levels to show a corresponding one of the first number of nodes.

9. A method according to claim 8, wherein said de-abstracting includes de-abstracting ones of the consolidated nodes in a reporting chain containing the corresponding one of the consolidated nodes.

10. A method according to claim 9, wherein said de-abstracting includes de-abstracting ones of the consolidated nodes in the reporting chain to a predetermined depth limit within the reporting chain.

11. A method according to claim 6, wherein the organization has a plurality of lateral segments, and said executing a visual rendering algorithm includes executing a visual rendering algorithm that laterally expands only the one of said plurality of lateral segments containing the first user selection.

12. A method according to claim 6, further comprising:
receiving, via the GUI, a second user selection within one of the corresponding respective ones of the consolidated nodes; and
in response to receiving the second user selection, rendering a first pop-out diagram containing a first subset of the corresponding respective ones of the consolidated nodes.

13. A method according to claim 12, further comprising:
receiving, via the GUI, a third user selection within one of the corresponding respective ones of the first number of nodes in the first subset; and
in response to receiving the third user selection, rendering a second pop-out diagram containing a second subset of the first subset of the corresponding respective ones of the first number of nodes.

14. A method according to claim 1, further comprising:
receiving, via the GUI, a second selection of a human resource attribute via the GUI; and
in response to receiving the second selection, overlaying the visual abstraction diagram with one or more visual cues depicting the human resource attribute.

15. A method according to claim 14, wherein the human resource attribute includes a numerical scale, the method further comprising:
receiving, via the GUI, a user-selected sub-range on the numerical scale; and
overlaying the visual abstraction diagram with one or more visual cues as a function of the user-selected sub-range.

16. A method according to claim 1, wherein said receiving organization data includes receiving historical hierarchical organizational data containing data that reflects organizational change over time, the method further comprising displaying on the electronic display contemporaneously with the visual abstraction diagram a time-scrubbing tool that permits a user to selectively view the organizational change over time.

17. A method according to claim 1, wherein the organization data includes a geographic location for each of the members of the organization and the visual abstraction diagram includes a geographical map, wherein:
said consolidating sibling nodes including consolidating at least some of the first number of nodes into consolidated nodes as a function of common geographical locations; and
said executing a visual rendering algorithm includes executing a visual rendering algorithm that automatedly renders the consolidated nodes at locations on the geographical map according to the common geographical locations.

18. A non-transitory computer-readable hardware storage medium containing machine-executable instructions for performing a method of rendering, on an electronic display, a visual abstraction diagram of an entire organizational chart having a first number of nodes, wherein the entire organizational chart represents an organization containing the first number of members, wherein the first number of members corresponds respectively to the first number of nodes on the entire organizational chart that contains a plurality of hierarchical levels, the method comprising:
receiving organization data representing the entire organizational chart containing the first number of nodes;
storing the organization data in memory;
retrieving a node-abstraction algorithm from the memory, wherein the node-extraction algorithm is configured to:
consolidate sibling nodes of the first number of nodes on various ones of the plurality of hierarchical levels to generate a plurality of consolidated nodes, wherein the total number of the plurality of consolidated nodes and all unconsolidated nodes, if any, is less than the first number of nodes; and
assign a weight to each parent node in the total number of the plurality of consolidated nodes and all unconsolidated nodes such that the weight on the parent node is equal to the sum of the weights of all child nodes of the parent node;
retrieving the organization data from the memory;
executing, using the organization data, the node-abstraction algorithm to create abstraction data representing an abstracted organizational chart containing the total number of the plurality of consolidated nodes and all unconsolidated nodes in a hierarchy, the abstraction data including the weight of each of the total number of the plurality of consolidated nodes and all unconsolidated nodes;
storing the abstraction data in the memory so that the weights are associated with correspond respective ones of the total number of the plurality of consolidated nodes and all unconsolidated nodes;
retrieving a visual rendering algorithm from the memory, wherein the visual rendering algorithm is configured to render sizes of the total number of the plurality of consolidated nodes and all unconsolidated nodes of the visual abstraction diagram as a function of the weights;
retrieving the abstraction data from the memory; and
executing, using the abstraction data, the visual rendering algorithm to render the visual abstraction diagram in entirety within a graphical user interface (GUI) on the electronic display;
wherein:
said executing a visual rendering algorithm includes visually merging ones of the consolidated nodes with one another; and
wherein the organization has a second number of lateral segments and said visually merging ones of the consolidated nodes with one another includes visually merging together all of the consolidated nodes within each of the plurality of lateral segments so as to create the second number of visually merged regions corresponding respectively to the second number of the lateral segments.

19. A non-transitory computer-readable hardware storage medium according to claim 18, wherein said executing a visual rendering algorithm includes executing a visual rendering algorithm that renders the visual abstraction diagram as a sunburst diagram.

20. A non-transitory computer-readable hardware storage medium according to claim 18, wherein said executing a visual rendering algorithm includes executing a visual rendering algorithm that renders the visual abstraction diagram as an icicle diagram.

21. A non-transitory computer-readable hardware storage medium according to claim 18, further comprising automatedly applying differing visual cues respectively to the second number of visually merged regions.

22. A non-transitory computer-readable hardware storage medium according to claim 21, wherein said applying the differing visual cues includes applying differing colors.

23. A non-transitory computer-readable hardware storage medium according to claim 18, further comprising:
receiving, via the GUI, a first user selection within a rendered abstracted node within the visual abstraction diagram;
in response to the first user selection, de-abstracting one or more consolidated nodes into corresponding respective ones of the first number of nodes; and
rendering the corresponding respective ones of the first number of nodes in the visual abstraction diagram.

24. A non-transitory computer-readable hardware storage medium according to claim 23, said de-abstracting one or more consolidated nodes includes de-abstracting the one or more consolidated nodes to no greater than a predetermined depth within the plurality of hierarchical levels.

25. A non-transitory computer-readable hardware storage medium according to claim 23, wherein the user selection occurs on a selected one of the plurality of hierarchical levels within the organization, said de-abstracting including de-abstracting one of the consolidated nodes on the selected one of the plurality of hierarchical levels to show a corresponding one of the first number nodes.

26. A non-transitory computer-readable hardware storage medium according to claim 25, wherein said de-abstracting includes de-abstracting ones of the consolidated nodes in a reporting chain containing the corresponding one of the consolidated nodes.

27. A non-transitory computer-readable hardware storage medium according to claim 26, wherein said de-abstracting includes de-abstracting ones of the consolidated nodes in the reporting chain to a predetermined depth limit within the reporting chain.

28. A non-transitory computer-readable hardware storage medium according to claim 23, wherein the organization has a plurality of lateral segments, and said executing a visual rendering algorithm includes executing a visual rendering algorithm that laterally expands only the one of said plurality of lateral segments containing the first user selection.

29. A nor-transitory computer-readable hardware storage medium according to claim 23, further comprising:
receiving, via the GUI, a second user selection within one of the corresponding respective ones of the consolidated nodes; and
in response to receiving the second user selection, rendering a first pop-out diagram containing a first subset of the corresponding respective ones of the consolidated nodes.

30. A non-transitory computer-readable hardware storage medium according to claim 29, further comprising:
receiving, via the GUI, a third user selection within one of the corresponding respective ones of the first number of nodes in the first subset; and
in response to receiving the third user selection, rendering a second pop-out diagram containing a second subset of the first subset of the corresponding respective ones of the first number of nodes.

31. A non-transitory computer-readable hardware storage medium according to claim 18, further comprising:
receiving, via the GUI, a second selection of a human resource attribute via the GUI; and
in response to receiving the second selection, overlaying the visual abstraction diagram with one or more visual cues depicting the human resource attribute.

32. A non-transitory computer-readable hardware storage medium according to claim 31, wherein the human resource attribute includes a numerical scale, the method further comprising:
receiving, via the GUI, a user-selected sub-range on the numerical scale; and
overlaying the visual abstraction diagram with one or more visual cues as a function of the user-selected sub-range.

33. A non-transitory computer-readable hardware storage medium according to claim 18, wherein said receiving organization data includes receiving historical hierarchical organizational data containing data that reflects organizational change over time, the method further comprising displaying on the electronic display contemporaneously with the visual abstraction diagram a time-scrubbing tool that permits a user to selectively view the organizational change over time.

34. A non-transitory computer-readable hardware storage medium according to claim 18, wherein the organization data includes a geographic location for each of the members of the organization and the visual abstraction diagram includes a geographical map, wherein:
said consolidating sibling nodes including consolidating at least some of the first number of nodes into consolidated nodes as a function of common geographical locations; and
said executing a visual rendering algorithm includes executing a visual rendering algorithm that automatedly renders the consolidated nodes at locations on the geographical map according to the common geographical locations.

* * * * *